United States Patent [19]

Lu et al.

[11] Patent Number: 5,550,928
[45] Date of Patent: Aug. 27, 1996

[54] AUDIENCE MEASUREMENT SYSTEM AND METHOD

[75] Inventors: Daozheng Lu, Buffalo Grove, Ill.; Ceril T. Shagrin, Palm Harbor; William L. Thomas, Clearwater, both of Fla.; Morris Lee, Buffalo Grove, Ill.; Bruce Bernard; Jia Zhang, both of Mundelein, Ill.

[73] Assignee: A.C. Nielsen Company, Northbrook, Ill.

[21] Appl. No.: 992,383

[22] Filed: Dec. 15, 1992

[51] Int. Cl.$^6$ ................................................. G06K 9/62
[52] U.S. Cl. .................... 382/116; 382/118; 382/103; 348/1
[58] Field of Search .................... 382/2, 1, 16, 25, 382/30, 115, 116, 118, 203, 209, 190, 103; 358/84, 108; 340/825.34; 348/1, 2, 5

[56] References Cited

U.S. PATENT DOCUMENTS

| | | | |
|---|---|---|---|
| 3,056,135 | 9/1962 | Currey et al. | 346/37 |
| 3,651,471 | 3/1972 | Haselwood et al. | 340/172.5 |
| 4,025,851 | 5/1977 | Haselwood et al. | 325/31 |
| 4,468,807 | 8/1984 | Moulton | 382/2 |
| 4,644,509 | 2/1987 | Kiewit et al. | 367/87 |
| 4,677,466 | 6/1987 | Lert, Jr. et al. | 358/84 |
| 4,723,302 | 2/1988 | Fulmer et al. | 455/2 |
| 4,769,697 | 9/1988 | Gilley et al. | 348/2 |
| 4,858,000 | 8/1989 | Lu | 358/84 |
| 4,930,011 | 5/1990 | Kiewit | 358/84 |
| 4,931,865 | 6/1990 | Scarampi | 348/2 |
| 4,943,963 | 7/1990 | Waechter | 370/94.1 |
| 4,993,049 | 2/1991 | Cupps | 377/6 |
| 5,031,228 | 7/1991 | Lu | 382/38 |
| 5,063,603 | 11/1991 | Burt | 382/2 |
| 5,121,201 | 6/1992 | Seki | 358/108 |
| 5,164,992 | 11/1992 | Turk et al. | 382/2 |
| 5,229,764 | 7/1993 | Matchett et al. | 382/2 |

OTHER PUBLICATIONS

"Extending the Feature Set for Automatic Face Recognition", Jia & Nixon Int'l Conference on Image Processing and its Applications pub. #354 pp. 155–158 Apr. 1992.

L. Sirovich and M. Kirby, "Low-dimensional procedurre for the characterization of human faces"; *Journal of the Optical Society of America A*, vol. 4, p. 519, Mar. 1987.

M. Kirby & L. Sirovich, "Application of the Karhunen–Loeve Procedure for the Characterization of Human Faces"; *IEEE Transactions on Pattern Analysis and Machine Intelligence*, vol. 12, No. 1, Jan. 1990, pp. 102–108.

Matthew Turk and Alex Pentland, "Eigenfaces for Recognition", *Journal of cognitive Neuroscience* vol. 3, No. 1, 1991, pp. 71–86.

Duda & Hart, "Bayes Decision Theory", *Pattern Classification Scene & Analysis*, 1973, pp. 10–43.

Bow, S. T., "Nonparametric Decision Theoretic Classification", *Pattern Recognition & Image Preprocessing*, 1992, pp. 18–43.

(List continued on next page.)

*Primary Examiner*—Michael T. Razavi
*Assistant Examiner*—Larry T. Prikockis
*Attorney, Agent, or Firm*—Marshall, O'Toole, Gerstein, Murray & Borum

[57] ABSTRACT

In a passive identification apparatus for identifying a predetermined individual member of a television viewing audience in a monitored viewing area, a video image of a monitored viewing area is captured. A template matching score is provided for an object in the video image. A Eigenface recognition score is provided for an object in the video image. These scores may be provided by comparing objects in the video image to reference files. The template matching score and the Eigenface recognition score are fused to form a composite identification record from which a viewer may be identified. Body shape matching, viewer tracking, viewer sensing, and/or historical data may be used to assist in viewer identification. The reference files may be updated as recognition scores decline.

22 Claims, 16 Drawing Sheets

OTHER PUBLICATIONS

Zimmermann, H.-J., "Tutorial B1: Fuzzy Set Applications In Pattern Recognition And Data-Analysis", *11th IAPR International Conference on Pattern Recognition*, The Hague 29 Aug. 1992, pp. 1–73.

Press, W. H., et al., "Numerical Recipes in C: The Art of Scientific Computing", Cambridge University Press, NY, 1988, pp. 60–63.

Wolfram, Stephen, "Mathematica A System For Doing Mathematics by Computer", 2d Ed., Addison–Wesley Publishing Company, Inc., 1991, pp. 665, 666.

AUDIENCE MEASUREMENT SYSTEM AND METHOD

RELATED APPLICATION

Patent application Ser. No. 07/872,881 filed on Apr. 23, 1992, now U.S. Pat. No. 5,331,544 issued Jul. 19, 1994, which is assigned to the same assignee as the present invention, discloses a face recognition system and method for identifying shoppers at multiple locations within a retail store and for correlating those shoppers with their purchases and with their responses to advertisements.

TECHNICAL FIELD OF THE INVENTION

The present invention relates to an apparatus and a method for identifying members of a television viewing audience or of a marketing research panel, and more particularly to an apparatus and a method for identifying these members without requiring the members to actively participate in the identification process.

BACKGROUND OF THE INVENTION

Measuring broadcast audiences is a matter of longstanding concern to broadcasters and advertisers because audience measurements provide the data from which the effectiveness of broadcast programs and advertisements may be evaluated. A variety of well known methods have been employed in order to provide an estimate of the total audience to a program, to a portion of a program, and/or to a commercial. These methods also provide additional detailed estimates of demographically significant audience segments (e.g. the number of women aged 18–34 who watched a given minute of a selected program). Many of these methods involve manually and/or automatically measuring the viewing habits of the members, usually referred to as panelists or viewers, of statistically selected households.

The measurement of the viewing habits of a viewing audience generally requires three separate measurements: 1) a measurement of the channels or stations to which the viewing equipment (i.e. receiver) within a statistically selected household is tuned; 2) a measurement of the programs which were available at the times during which the viewing equipment was tuned to the viewed channels; and, 3) a measurement of the household members who were actually in front of the viewing equipment at the times that the viewing equipment was tuned to the measured channels.

The first of these measurements has long been made in sampled households with equipment that requires no active participation on the part of the viewer. For example, the system disclosed by Haselwood et al in U.S. Pat. No. 3,651,471 collects a real-time log of time-stamped tuning events for subsequent retrieval via a public switched telephone network. Later equipment, such as taught by Waechter et al in U.S. Pat. No. 4,943,963 provides, inter alia, the capability of editing the logged data prior to the transmission of the logged data to a data collection center.

The second of the above enumerated measurements has been done in a variety of ways, none of which involve either the active or the passive participation of the members of sampled households. For example, the system disclosed by Haselwood et al in U.S. Pat. No. 4,025,851 encodes a program or a commercial with an identification code which can be monitored in the field to verify (a) that a program or commercial has been broadcast and (b) the time of the broadcast. As another example, the system disclosed in U.S. Pat. No. 4,677,466 employs pattern recognition to verify both the fact and the time that a program or commercial has been broadcast.

The third of the above enumerated measurements has generally required some level of active participation by viewers. Widely used methods for measuring the composition of a television viewing audience have included the use of viewing diaries (in which a viewer manually logs a record of his or her viewing activity in a booklet that is physically returned to a data collection center) or by electronic "push-button" terminals (in which each viewer manually indicates his or her presence by the use of a small keyboard). A major shortcoming of these audience measurement systems is that such systems require some degree of active participation on the part of the viewer. This requirement is believed to reduce viewer cooperation and, as a result, to impair the statistical quality of the measurement.

Currey et al in U.S. Pat. No. 3,056,135 disclose an early, mostly passive, method of measuring a viewing audience. This method provides a record of the number and identity of persons in an audience by utilizing strategically placed switches for counting the number of persons entering, leaving, and remaining within a particular area, and a photographic recorder for periodically recording the composition of the audience. This approach requires that the photographic record be viewed by an operator, which both invades the viewers' privacy and imposes an unacceptable cost on the measurement operation.

The absence of an acceptable approach to identifying individual viewers passively led to a variety of suggestions for passive, non-obtrusive methods of counting (but not identifying) viewers and of tracking their movements about the viewing area. Notable among these is the teaching by Kiewit and Lu in U.S. Pat. No. 4,644,509 of an ultrasonic sonar system. The various passive methods of audience counting and tracking that have been suggested have found little acceptance in commercial practice for the fundamental reason that such methods fail to identify the members of the viewing audience. Furthermore, if the individual members of a sampled household are not uniquely identified, the various demographic information usually provided in viewing reports is not, generally speaking, readily ascertainable.

Methods aimed at providing unique viewer identity while reducing, but not eliminating, an active effort on the part of the viewer are also known. These methods have included the use of electronically active tags that can be used to indicate a viewer's presence. Devices of this sort have been taught, inter alia, by Kiewit in U.S. Pat. No. 4,930,011. Such systems are not truly "passive" because the viewer is required to make a conscious, ongoing effort to wear, or be in possession of, the tag.

More recently, passive, non-obtrusive methods of audience measurement have been taught by Lu in U.S. Pat. Nos. 4,858,000 and 5,031,228. The disclosures of these U.S. Pat. Nos. 4,858,000 and 5,031,228 are herein incorporated by reference. These patents teach an automatic system that uses a video camera to acquire an image of the face of a television audience member, and a computer subsystem to recognize that facial image by comparing that facial image to reference facial images stored in a data base. This system also includes passive infrared scanners for locating and tracking viewers, and covert near-infrared illuminators that provide a controllable level of illumination for the video camera. Camera systems of the sort taught in these patents have been shown to be capable of correctly identifying a known member of a television audience most of the time when the known member is seated with his or her face turned toward the television set and is in a reasonably well-lighted area. Such systems, however, fail to identify a viewer whose head is turned away from the camera, or who is entering or leaving the viewing area. In other words, a known person, who is present in the viewing area, can only be identified by prior art passive audience measurement systems for a fraction of a monitored time period. Furthermore, the system taught by Lu in U.S. Pat. Nos. 4,858,000 and 5,031,228 uses a single video camera and a mechanical scanning mechanism to cover a wide field of view. The noise of this mechanical scanning mechanism can disturb viewers in the viewing area.

Similarly, individuals can be identified and tracked for marketing research applications in environments other than television audience situations. Lu et al, in U.S. Pat. No. 5,331,544, which was issued on Jul. 19, 1994, teach a system and method for identifying shoppers within a retail store and for correlating the identity of these shoppers with their purchases and with their responses to advertisements. The disclosure of U.S. Pat. No. 5,331,544 is herein incorporated by reference.

SUMMARY OF THE INVENTION

The present invention combines multiple recognition methods to increase the accuracy of a passive audience measurement system. Therefore, an apparatus for passively identifying an individual in a monitored area according to one aspect of the present invention includes an image capturing means for capturing a video image of a monitored area. A first means provides a first identity-indicating score relative to an individual in the video image wherein the first means relies upon a first recognition methodology. A second means provides a second identity-indicating score relative to the individual wherein the second means relies upon a second recognition methodology different from the first recognition methodology. A fusing means fuses the first and second identity-indicating scores to form a composite identification record therefrom from which the individual may be identified.

An image recognition apparatus for passively identifying individuals in a monitored area according to a further aspect of the present invention includes a means for storing a first set of reference facial image signatures wherein each reference facial image signature in the first set corresponds to a predetermined one of said individuals and is formed from an initial image of a predetermined individual by a first facial recognition methodology. A means stores a second set of reference facial image signatures wherein each reference facial image signature in the second set corresponds to a predetermined one of said individuals and is formed from an initial image of a predetermined individual by a second facial recognition methodology which is different from the first facial recognition methodology. An image capturing means captures a video image of a monitored area. A means extracts a first current facial image signature from the video image by utilizing the first facial recognition methodology and provides a first set of identity-indicating scores by comparing the first current facial image signature to each reference facial image signature of the first set of reference facial image signatures. A means extracts a second current facial image signature from the video image by utilizing the second facial recognition methodology and provides a second set of identity-indicating scores by comparing the second current facial image signature to each reference facial image signature of the second set of reference facial image signatures. And, a means fuses the first and second sets of identity-indicating scores to form a third set of composite identity-indicating scores from which individuals may be identified.

A system for identifying a predetermined individual in a monitored area according to another aspect of the present invention includes a means for capturing first and second current images of the monitored area at different times. A means stores a reference facial image signature corresponding to the predetermined individual. A means extracts, from the first current image of the monitored area, a current facial image signature and compares the current facial image signature with the reference facial image signature to form a facial image identification record corresponding to the predetermined individual. And, a means tracks the identified predetermined individual from the first current image to the second current image.

An image recognition system for identifying an individual in a monitored area according to yet another aspect of the present invention includes a storing means for storing a plurality of reference facial image signatures and a plurality of reference body shape signatures, each stored reference facial image signature and each reference body shape signature corresponding to a predetermined individual. A video camera apparatus captures a current image of an individual in the monitored area. A means is responsive to the video camera apparatus for extracting a current facial image signature from the current image, for extracting a current body shape signature from the current image, for comparing the current facial image signature with the stored reference facial image signatures to thereby generate a first set of scores wherein each score of the first set of scores represents a degree of agreement between the current facial image signature and a corresponding stored reference facial signature, for comparing the current body shape signature with the stored reference body shape signatures to thereby generate a second set of scores wherein each score of the second set of scores represents a degree of agreement between the current body shape signature and a corresponding stored reference body shape signature, for forming a composite set of scores from the first and second sets of scores, and for selecting a maximum score from the composite set of scores.

A system for identifying predetermined individuals in a monitored area according to a still further aspect of the invention includes a means for forming a first probability estimate that predetermined individuals are present in the monitored area wherein the first probability estimate is based upon an historical record of the presence of the predetermined individuals in the monitored area. A storing means stores a plurality of reference facial image signatures wherein each of the reference facial image signatures corresponds to a predetermined individual. A means captures a current image of the monitored area and a current facial image signature is extracted from the current image. A comparing means compares the current facial image signature with the reference facial image signatures to form a second probability estimate that predetermined individuals are present in the monitored area. An identifying means identifies predetermined individuals from the first and second probability estimates.

A method for determining that a predetermined individual is present in a monitored area during a predetermined time interval according to still another aspect of the invention includes the following steps: forming a first set of reference facial image signatures wherein each reference facial image signature of the first set is extracted from an initial image of a plurality of individuals according to a first methodology; forming a second set of reference facial image signatures wherein each reference facial image signature of the second set is extracted from an initial image of the plurality of individuals according to a second methodology which is different from the first methodology; capturing a current image of the monitored area; locating a face of an individual from the current image; extracting a first current facial image signature from the located face by use of the first methodology; comparing the first current facial image signature with the first set of reference facial image signatures to generate a first set of scores; extracting a second current facial image signature from the located face by use of the second methodology; comparing the second current facial image signature with the second set of reference facial image signatures to generate a second set of scores; combining the first and the second sets of scores to form a composite set of scores; and, determining if the predetermined individual is present in the monitored area from the composite set of scores.

A method for tracking an individual within a monitored area according to yet a further aspect of the invention includes the following steps: forming a first reference facial image signature related to the individual according to a first methodology; forming a second reference facial image signature related to the individual according to a second methodology which is different from the first methodology; obtaining a current image and a set of subsequent images of the monitored area; locating a current facial image of the individual in the current image; extracting a first current facial image signature from the current facial image by use of the first methodology; comparing the first current facial image signature with the first reference facial image signature to generate a first score; extracting a second current facial image signature from the current facial image by use of the second methodology; comparing the second current facial image signature with the second reference facial image signature to generate a second score; identifying the individual from the first and second scores; and, tracking the identified individual from the current image through at least some of the subsequent images.

A method for identifying individuals within a monitored area according to a still yet further aspect of the invention includes the following steps: a) constructing reference facial image signatures, each of the reference facial image signatures corresponding to individuals who may be in the monitored area; b) counting the individuals within the monitored viewing area; c) locating a member in the monitored area; d) computing a quantitative estimate that the located individual is one of the individuals who may be in the monitored area; e) performing steps c) and d) a number of times equal to the counted individuals in the monitored area to thereby form a set of quantitative estimates; f) determining a maximum quantitative estimate of the set of quantitative estimates; g) comparing the maximum quantitative estimate with a predetermined threshold; h) assigning an identity label of "guest" to an individual in the monitored area who has a corresponding quantitative estimate which is less than the threshold value; i) identifying an individual in the monitored area who has a corresponding quantitative estimate which is greater than the threshold value; and, j) repeating steps f) through i) until all quantitative estimates in the set of quantitative estimates have been so processed.

A system of identifying predetermined individuals in a monitored area according to yet a further aspect of the invention includes a means for capturing a plurality of current video images from the monitored area. A generating means generates a first facial identity estimate from a current video image by use of a first methodology, a second facial identity estimate from the current video image by use of a second methodology wherein the second methodology is different than the first methodology, and a further estimate from at least one of the following set: i) a statistical identity estimate derived from an historical record indicating that predetermined individuals were present in the monitored area during selected past times, ii) a body shape identity estimate resulting from a comparison of a body shape of objects in a current image to reference body shapes of the predetermined individuals, iii) an estimate of a number of persons present in the monitored area at the instant that a current video image was captured, and iv) a tracking record obtained by tracking a person from one current image to a subsequent image. An identifying means identifies the predetermined individuals based upon the first and second facial identity estimates and the further estimate.

A method of adaptively identifying a predetermined individual whose appearance changes between a first time and a second time that the predetermined individual in a monitored area according to a further aspect of the invention includes the following steps: storing a reference facial image signature and a reference body shape signature wherein the reference facial image signature and the reference body shape signature correspond to the predetermined individual; capturing a first current image of the predetermined individual in the monitored area at a first time; extracting a first current facial image signature from the first current image; extracting a first current body shape signature from the first current image; comparing the first current facial image signature with the reference facial image signature to thereby generate a first score representing a degree of agreement between the first current facial image signature and the reference facial image signature; comparing the first current body shape signature with the reference body shape signature to thereby generate a second score representing a degree of agreement between the first current body shape signature and the reference body shape signature; selecting the larger of the first and second scores as a first maximum score, the first maximum score corresponding to the predetermined individual; capturing a second current image of the predetermined individual in the monitored area at a second time; extracting a second current facial image signature from the second current image; extracting a second current body shape signature from the second current image; comparing the second current facial image signature with the reference facial image signature to thereby generate a third score representing a degree of agreement between the second current facial image signature and the reference facial image signature; comparing the second current body shape signature with the reference body shape signature to thereby generate a fourth score representing a degree of agreement between the second current body shape signature and the reference body shape signature; selecting the larger of the third and fourth scores as a second maximum score, the second maximum score corresponding to the predetermined individual; comparing the first and second maximum scores to determine a difference therebetween; replacing the reference facial image signature corresponding to the predetermined individual with the second current facial image signature if the difference between the first and second maximum scores exceeds a predetermined value; and, replacing the reference body shape signature corresponding to the predetermined individual with the second current body shape signature if the difference between the first and second maximum scores exceeds a predetermined value.

An image recognition apparatus for identifying a predetermined individual from a set of unknown individuals who may be in a monitored area according to a yet further aspect of the invention includes a means for storing a first library of image signatures formed from a first set of images, each image signature of the first library of image signatures relating to a set of known individuals. A means generates reference identification parameters from the first library and from a set of initial video images, each of the reference identification parameters corresponding respectively to a member of the set of known individuals, the reference identification parameters being generated according to a first methodology. A means generates reference facial image signatures from the set of initial video images, each of the reference facial image signatures corresponding respectively to a member of the set of known individuals, the reference facial image signatures being generated according to a second methodology. A means stores the reference identification parameters and the reference facial image signatures. A means captures a current image of unknown individuals in the monitored area. A means generates a current identification parameter related to an unknown individual in the current image, the current identification parameter being generated according to the first methodology. A means compares the current identification parameter with the reference identification parameters to thereby generate a first set of scores wherein each score of the first set of scores represents a degree of agreement between the current identification parameter and a corresponding one of the reference identification parameters. A means generates a current facial image signature related to the unknown individual in the current image, the current facial image signature being generated according to the second methodology. A means compares the current facial image signature with the reference facial image signatures to thereby generate a second set of scores wherein each score of the second set of scores represents a degree of agreement between the current facial image signature and a corresponding one of the reference facial image signatures. A means forms a set of composite scores from the first and second sets of scores wherein each composite score is a single score derived from a score of the first set of scores and a corresponding score of the second set of scores. And, a means selects which of the composite scores has a maximum value to identify the unknown individual.

An apparatus for identifying an individual in a monitored area according to yet another aspect of the invention includes an image capturing means for capturing a video image of the monitored area. A first means provides a first identity-indicating score relative to the individual in the video image, the first identity-indicating score being based upon a face recognition methodology. A means interrogates the individual and requires the individual to supply a manually supplied identity datum. A manual input means manually supplies the manually supplied identity datum. And, a fusing means fuses the identity-indicating score and the manually supplied identity datum.

DESCRIPTION OF THE DRAWING

These and other features and advantages will become more apparent from a detailed consideration of the invention when taken in conjunction with the drawing in which.

DETAILED DESCRIPTION OF THE PREFERRED EMBODIMENT

Figure 1:
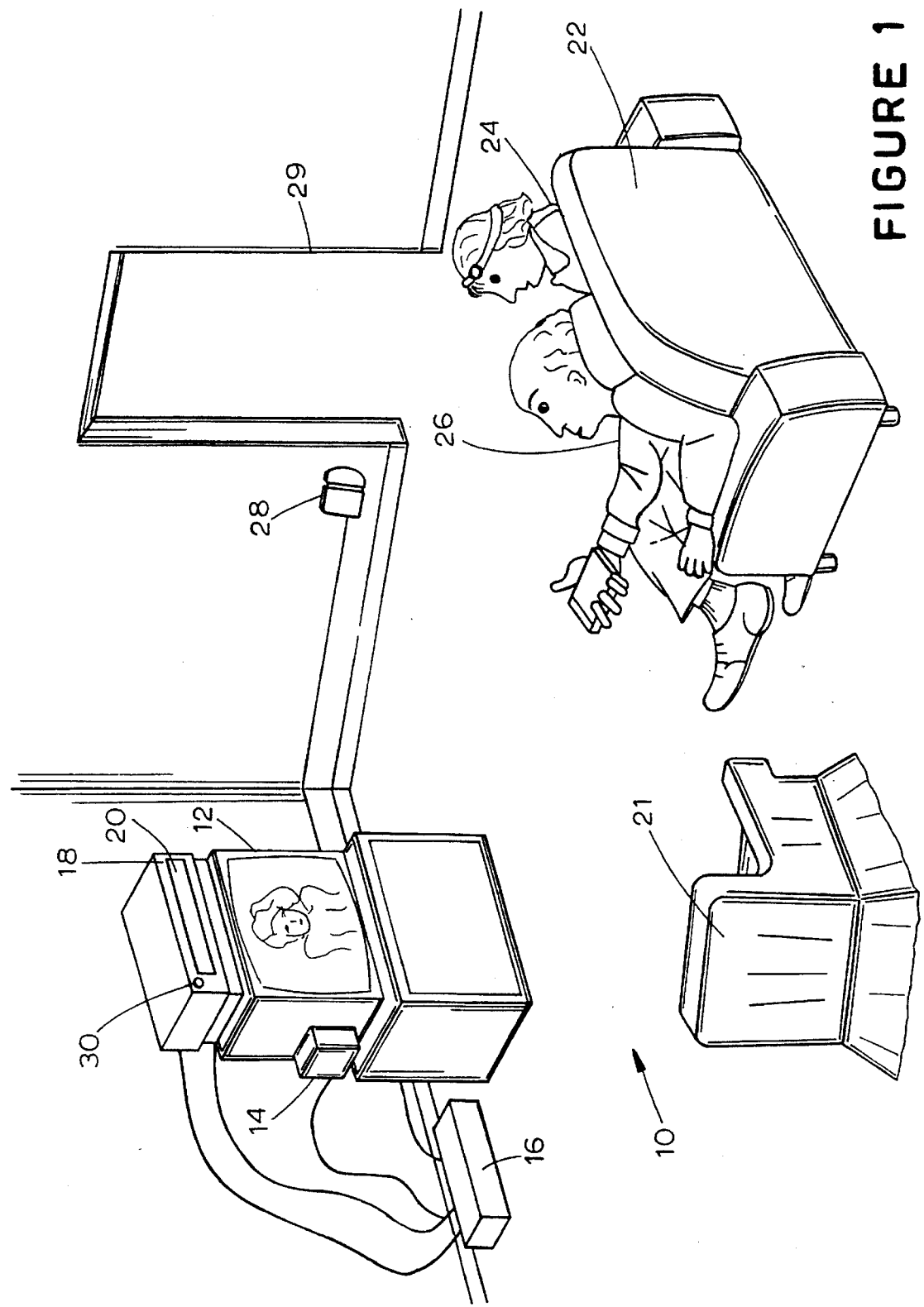
FIG. 1 illustrates an audience measurement system for use in a household monitored viewing area according to the present invention.

A monitored viewing area 10, which is commonly a room of a statistically selected dwelling unit or household, is shown in FIG. 1. Within the monitored viewing area 10 may be entertainment equipment, such as a television set 12, which is equipped with a channel monitoring device 14 for the purposes of monitoring the on/off status and the tuning status of the television set 12 and of transmitting status data to a local measurement computer 16. The local measurement computer 16 can, in turn, communicate to a "home unit" which collects data from all such local measurement computers in the house. For example, a local measurement computer 16 may be devoted to each television set in the house and data from each such local measurement computer may be collected by a "home unit" for supply periodically to a remotely located central computer over such communication channels as the public telephone system.

A variety of methods that are known in the art of broadcast audience measurement may be used to determine when the monitored television equipment is in use and to determine the channel to which the television set 12 is tuned. These methods include, inter alia, non-invasively detecting the local oscillator signal of a television tuner as taught by Fulmer et al in U.S. Pat. No. 4,723,302. Other examples of such monitoring devices are disclosed in the aforementioned U.S. Pat. Nos. 3,651,471 and 4,943,963. Once measured, the on/off status and the tuning status may be transferred to the local measurement computer 16 via a variety of physical links such as dedicated signal wiring or the household AC power wiring that serves the monitored viewing area 10.

A video equipment module 18 having a window 20 is placed so that the window 20 is directed at the monitored viewing area 10 in order to observe as many viewing positions therein as possible. These viewing positions include, for example, a chair 21 and a sofa 22 on which persons 24 and 26 may be seated when watching the television set 12. A counting sensor 28 may be located at an entryway 29 and a motion sensor 30 may be located on the video equipment module 18 for determining when people are present in, are entering or leaving, or are moving about in the monitored viewing area 10. An example of a counting sensor 28 is shown in the aforementioned U.S. Pat. No. 4,993,049. The number of occupants in the monitored viewing area 10 as determined by the counting sensor 28 is used in a decision making process as will be further discussed below.

Figure 2:
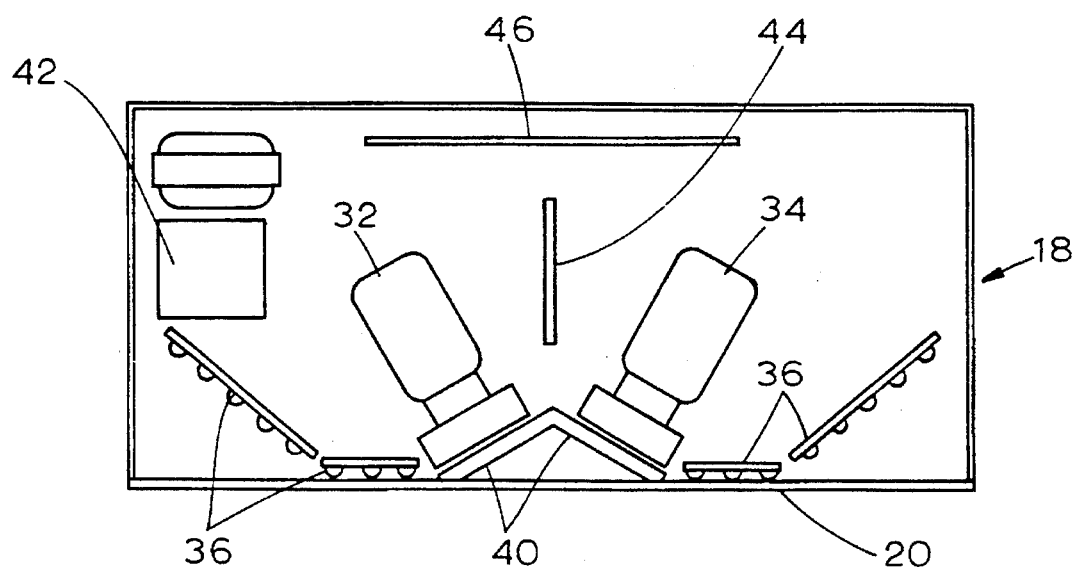
FIG. 2 is a top elevational internal view showing additional detail of the video equipment module 18 of FIG. 1.

The video equipment module 18, as shown in more detail in FIG. 2, includes two video cameras 32 and 34 (which may be the Ci-20R model video camera provided by Canon Corporation and which provide good sensitivity in the near-infrared portion of the electromagnetic spectrum). The cameras 32 and 34 are positioned to cover a wider field of view than either camera could cover by itself. Wide angle illumination is provided by arrays 36 of infrared emitting diodes (or IREDs), which may, for example, include a total of 320 IREDs each providing a radiant flux output of thirty seven milli-watts. The window 20 may be comprised of a suitable IR filter material which blocks visible light so that the members of the viewing audience cannot see the cameras 32 and 34 but which passes IR for reception by the cameras 32 and 34. Additionally, bandpass filters 40 are also preferably used to block out ambient radiation in order to reduce the intensity of "hot spots" which may, for example, be caused by the presence of light sources in the field of view of the cameras 32 and 34 and which may otherwise adversely affect the images taken by these cameras.

The video equipment module 18 may also include a power supply 42 for both the cameras 32 and 34 and the arrays 36. A pulse controller 44 and a regulator 46 are also included for controlling illumination of the arrays 36. Controlling the illumination pulse width and power output, as is well known in the art, can ensure that images of the monitored viewing area 10 can be captured by the cameras 32 and 34 for any low to moderate level of ambient illumination.

Images are periodically captured by the cameras 32 and 34 of the video equipment module 18 (e.g. every two seconds). These images are digitized and multiplexed by a multiplexer and digitizer 50 shown in FIG. 3. These known functions in an image processing system may be preferably provided by a video multiplexer (such as the model DT-2859, made by Data Translation Corporation of Marlboro, Mass.), and a video digitizer (such as a model DT-2853, also made by Data Translation Corp) that are configured as plug-in boards for a computer that uses the IBM® PC/AT bus.

Figure 3:
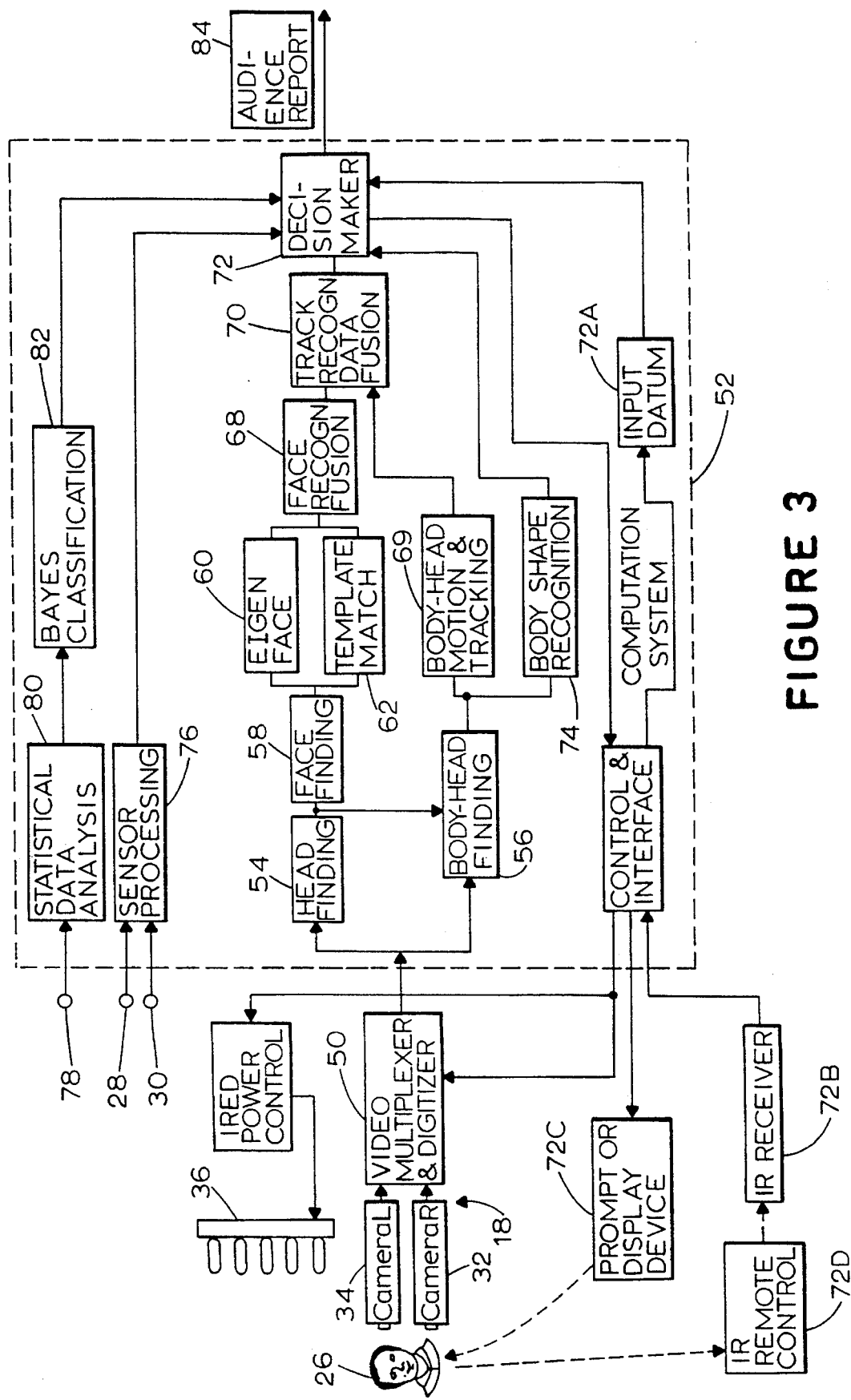
FIG. 3 is a hardware and overall functional block diagram of the audience measurement system of the present invention.

Also shown in FIG. 3 is a functional block diagram overview of the primary functions which are performed by a computing system 52 of the local measurement computer 16 on the digitized images from the multiplexer and digitizer 50, on the sensor information from the counting sensor 28 and from the motion sensor 30, and on certain statistical data. The computing system 52 may, for example, be a personal computer. The arrowed lines in FIG. 3 are meant to be illustrative of the relationships between various functions, and are not meant to show the sequential order of the computational process performed by the computing system 52. Thus, some of the functions that appear to be parallel in FIG. 3 are actually performed in a series fashion that is more compatible with conventional computer hardware and software. It is also noted that, in subsequent figures of the drawing, solid arrowed lines denote the flow of computational processes and dashed arrowed lines denote the flow of data.

As indicated in FIG. 3, the digitizer and multiplexer 50 provides suitable digital images of the monitored viewing area 10 for further processing by the computing system 52. A head finding routine 54 and a body-head finding routine 56 locate viewers' heads and bodies in the images supplied by the digitizer and multiplexer 50. A face finding routine 58 provides facial image representations that are provided as inputs to two face recognition routines, i.e. an Eigenface routine 60 and a template matching routine 62. The head finding routine 54 and the body-head finding routine 56 are discussed in greater detail below and by Lu et al in the aforementioned U.S. Pat. No. 5,331,544.

Before the head finding routine 54 and the face finding routine 58 are performed, however, viewers are tracked from image to image. Tracking is initiated by detecting motion in the monitored viewing area 10. In order to detect motion, sequential images of the monitored viewing area 10 are obtained from the video multiplexer and digitizer 50 and each sequential pair of such images are subtracted one from the other in order to determine if motion has occurred. That is, if one video image of the viewing area is different than the next video image of the same viewing area, it may be concluded that the difference is due to motion. If motion is detected, the viewers appearing in previous images of the monitored viewing area 10 are tracked; if no motion is detected, no tracking needs to be performed. The difference image obtained by subtracting one image from another, in combination with tracking, may also provide an indication of whether a new viewer has entered the monitored viewing area 10.

Face recognition is provided by the Eigenface routine 60 and the template matching routine 62. Results from the Eigenface routine 60 and the template matching routine 62 are output to a face recognition fusion routine 68 which combines the results from the two face recognition routines into a single result. This fusion result is combined with results from a body-head tracking routine 69 by a tracking-recognition fusion routine 70.

The output from the tracking-recognition fusion routine 70 is provided to a decision-maker 72. The results of a body shape recognition routine 74 are also supplied to the decision maker 72. The other inputs to the decision maker 72 do not involve video images. These other inputs include data from the counting sensor 28 and the motion sensor 30 which data may be suitably processed by a sensor processor 76, and historical data 78 that are subjected to a statistical data analysis routine 80 and a Bayes classification 82 before being supplied to the decision maker 72. The use of multiple routines in the identification process, as will be subsequently discussed, increases the probability of successfully determining the identity of a viewer in the monitored viewing area 10, thereby improving the quality of the audience report 84 provided as an output of the computing system 52.

Figure 4:
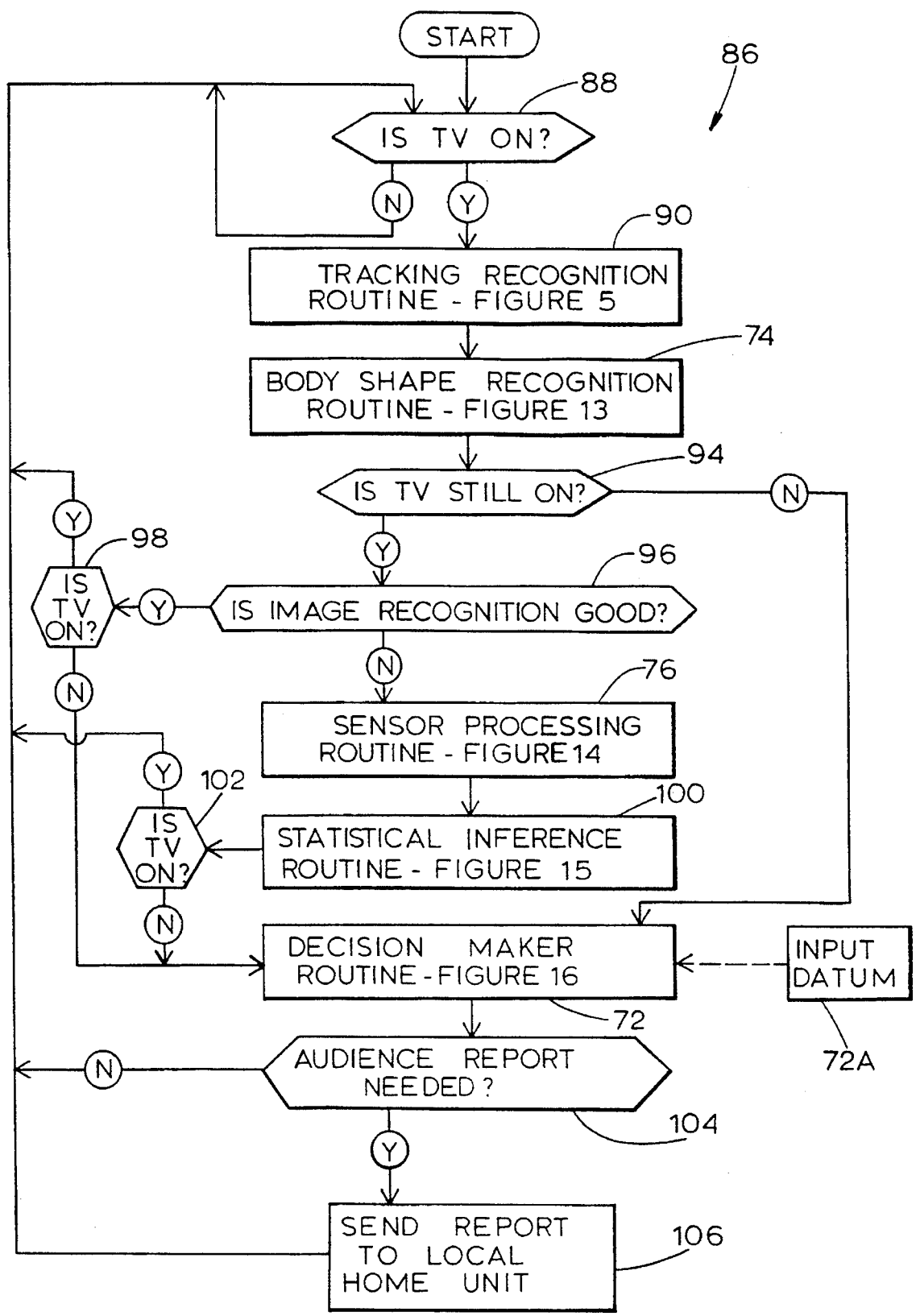
FIG. 4 of the drawing is a flow chart of the main software program employed by the computing system 52 shown in FIG. 3.

The overall flow of a program 86 performed by the computing system 52 of FIG. 3 is illustrated in FIG. 4. In the program 86, a block 88 monitors whether the television set 12 lies dormant or is turned on. If the television set 12 is off, the block 88 continues to monitor the on/off status of the television set 12. However, if the television set 12 is on, then a block 90 performs a face tracking and recognition routine which combines the head finding routine 54, the body-head finding routine 56, the face finding routine 58, the Eigenface recognition routine 60, the template matching recognition routine 62, the face recognition fusion routine 68, the body-head motion and tracking routine 69, and the tracking/recognition routine 70. The program 86 also performs the body shape recognition routine of the block 74.

Following these routines, a block 94 determines whether the television set 12 is on and, if the television set 12 is still on and if the image recognition is good as determined by a block 96, the tracking and face recognition routine and the body shape recognition routine are again performed by the blocks 90 and 74, respectively, until either the block 94 determines that the television set 12 is off or the block 96 determines that image recognition is not good. The block 96 determines that image recognition is good if the recognition scores resulting from the face tracking and recognition routine of the block 90 and the body shape recognition routine of the block 74 are high as compared to a threshold. On the other hand, the block 96 determines that image recognition is not good if the recognition scores resulting from the face tracking and recognition routine of the block 90 and the body shape recognition routine of the block 74 are low as compared to a threshold. These scores will be discussed more fully below.

Only when the block 96 determines that image recognition is not good will the block 76 gather sensor information from the counting sensor 28 and from the motion sensor 30 and will a block 100, which combines the statistical data analysis routine of the block 80 and the Bayes classification of the block 82, perform a statistical inference routine. Thus, the routines of the blocks 76 and 100 are omitted as long as image recognition is good. After the sensor information routine of the block 76 and the statistical inference routine of the block 100 have been performed, the program returns to the block 88 where the tracking and face recognition routine and the body shape recognition routine are again performed by the blocks 90 and 74, respectively, if the block 88 determines that the television set 12 is still on.

When the block 94 determines that the television set 12 has been turned off, the block 72 performs a decision making routine to identify the viewers in the monitored viewing area 10 based upon (i) Eigenface and template face recognition and tracking as performed by the block 90, (ii) body shape recognition as performed by the block 74, (iii) sensor processing as performed by the block 76, and (iv) certain statistical inferences made by the block 100. At this point, a block 104 determines whether an audience report is needed. An audience report may be required, for example, when the aforementioned "home unit" polls the computing system 52 of the local measurement computer 16 requesting tuning data and the identity of the viewers in the monitored viewing area 10. If an audience report is needed, a block 106 sends the report to the "home unit." If an audience report is not needed, the program returns to the block 88. Blocks 98 and 102 are included to ensure that, whenever the television set 12 is turned off during any active processing stage of the program 86, the decision maker 72 will be entered to identify the viewers in the monitored viewing area 10.

Figure 5:
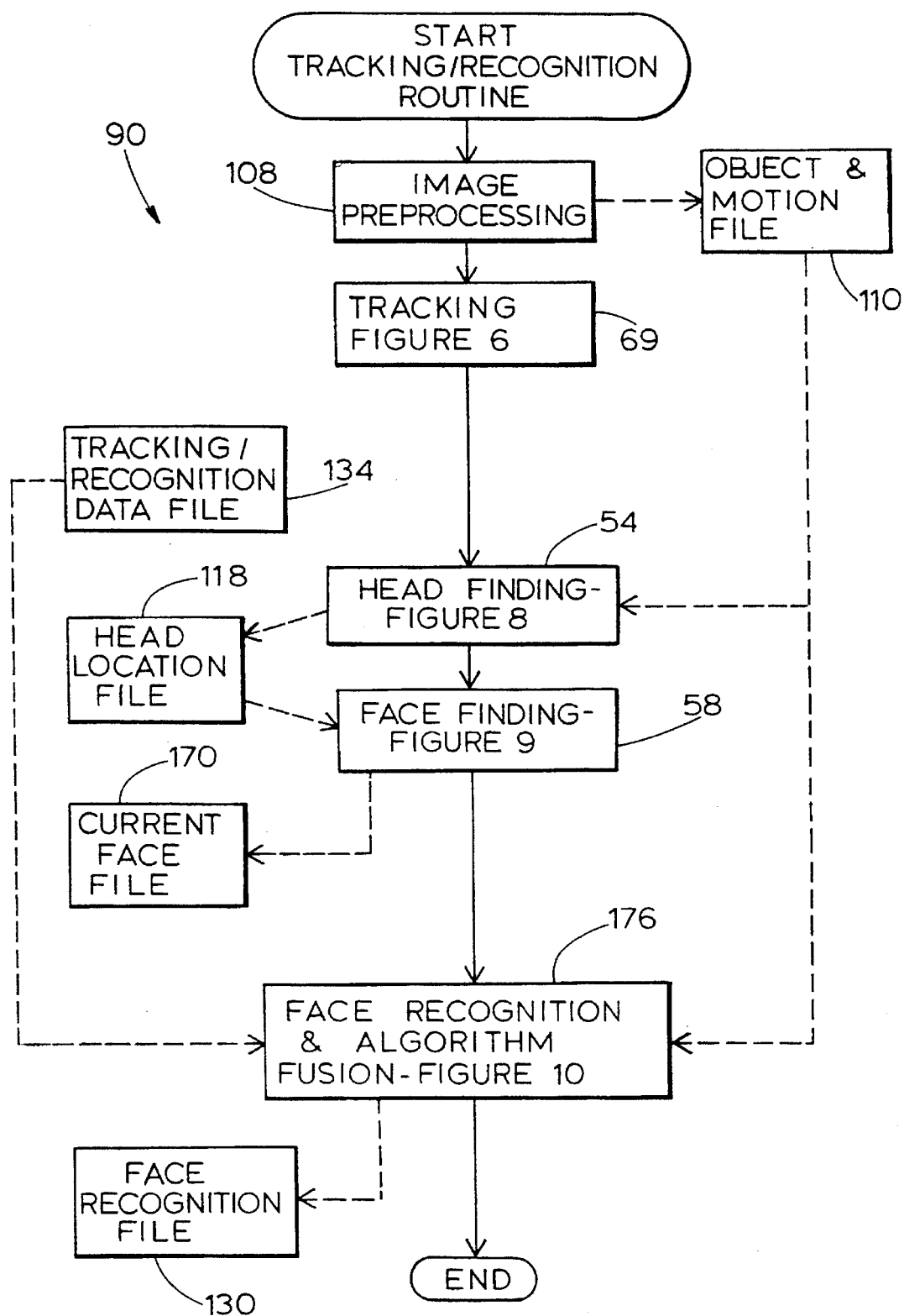
FIGS. 5–12 show a flow chart of the tracking recognition routine of FIG. 4.

The tracking/recognition routine 90 is shown in greater detail in FIG. 5. This routine is periodically entered if the block 88 determines that the TV is on. Each time that the routine 90 is entered, a block 108 energizes the IRED arrays 36 in order to illuminate the monitored viewing area 10 with IR. IR is not visible to the viewers and is, therefore, not distracting. At the same time, the block 108 causes the cameras 32 and 34 to capture an image of the monitored viewing area 10, and stores a foreground image, which is obtained by subtracting the image from the cameras 32/34 and a background image, in an object and motion file 110. Note that a video image of the background may be initially taken, and periodically rechecked, during times when no viewers are expected to be in the viewing area (such as when the counting sensor 28 and the motion sensor 30 confirm that no one is present in the monitored viewing area 10). This foreground image may then be subjected to lowpass filtering to remove much of the image noise, as is known in the art of image processing. For example, when the background is subtracted from the current image, the background is not only subtracted from the background in the current image but is also subtracted from the viewers in the current image. Thus, the appearances of the viewers in the resulting foreground image are distorted. Consequently, the foreground image is thresholded in order to filter out the noise introduced into the appearances of the viewers in the current image by the subtraction of the background image from the current image. The foreground image contains objects not present in the background image. Among these objects are any viewers who happen to be in the monitored viewing area 10. At this point, the block 69 of the tracking/recognition routine 90 tracks the viewers which were in a previous image of the monitored viewing area 10.

Figure 6:
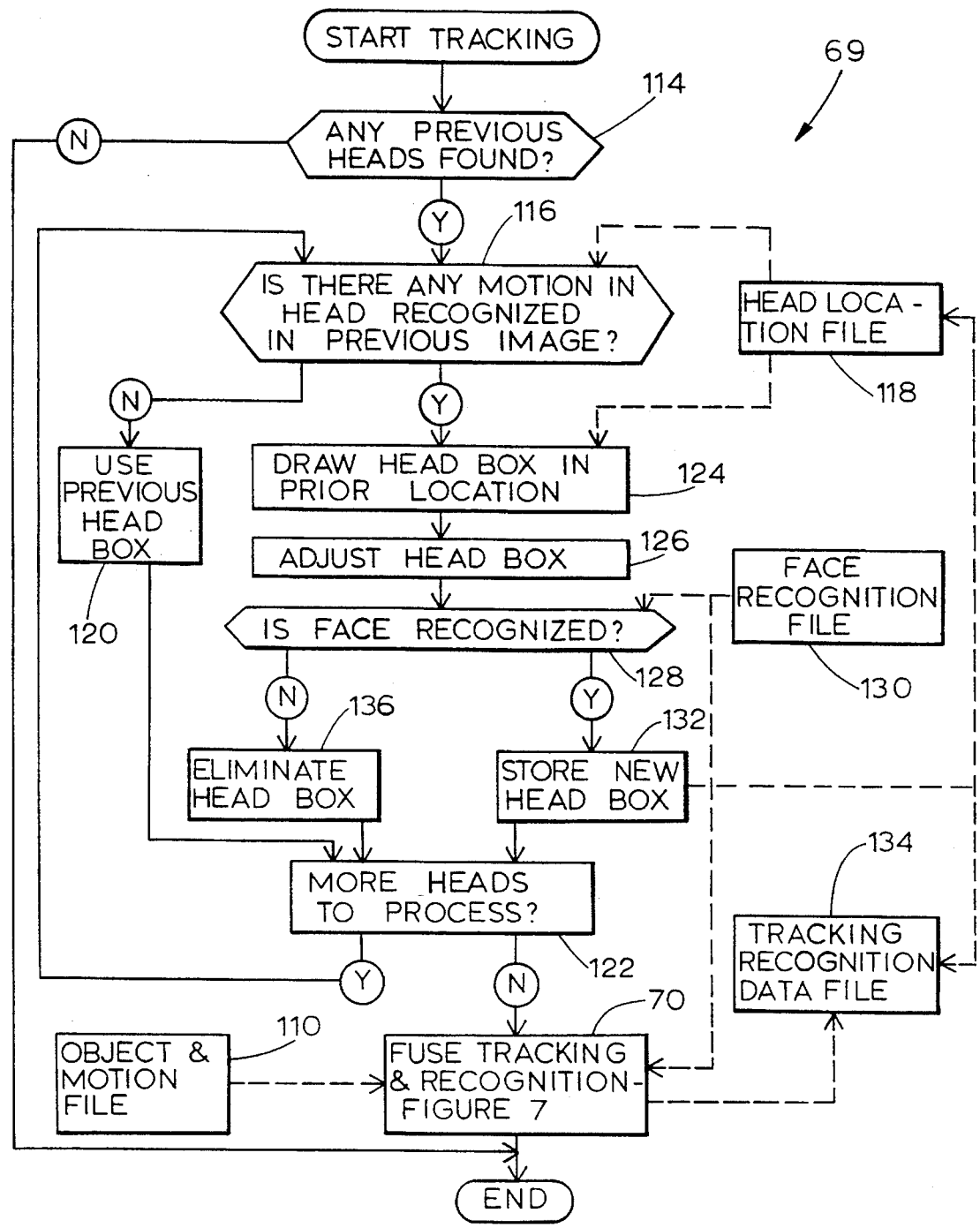

This tracking routine of the block 69 is shown in more detail in FIG. 6. As is well known in the art of video tracking systems (e.g. as are applied to missile guidance problems), a sequence of video images can be used to track and locate a target or a plurality of targets over a time interval. In the present case of an audience recognition system, it is necessary that the system track multiple individuals simultaneously in order to link each of their positions at various instants within a time interval with one or more positions at which they were identified.

The tracking routine 69 tracks the faces which were found in the previous image of the monitored viewing area 10 to the current image. Thus, as each image of the monitored viewing area 10 is taken, the viewers may be tracked from one image to the next. This tracking information is used in conjunction with face recognition to increase the confidence level in the recognition process. That is, if a viewer is recognized in an image, the confidence in that recognition increases if that viewer is tracked from a previous image.

Upon the tracking routine 69 being entered, a block 114 determines whether any previous heads have been found. For example, if the television set 12 has just been turned on, there is no previous image of the monitored viewing area 10 so that no previous heads could have been found. Therefore, if no previous heads had been found, the tracking routine 69 is ended and the head finding routine 54 is entered as shown in FIG. 5. On the other hand, if a previous head was found, a block 116 determines whether there was any motion in that head recognized in the previous image. The block 116 makes this determination by comparing the current image with the location of the head stored in a head location file 118. If there was no detected motion (i.e. a head in the current image is in the same location as it was in the previous image), a block 120 permits the use of the head box which was drawn for the head in connection with the previous image and a block 122 determines whether there are any more heads to process. If there are, the tracking routine 69 returns to the block 116. If the block 116 detects that there was motion, a block 124 draws a head box around the same location in the current image where the head was located in the previous image. A block 126 adjusts the position and size of the "tracked" head box by searching for edges of the head. This search is made first in the direction of any previous motion of that head. If the head cannot be thusly found, any suitable search methodology, such as a spiral search, may next be implemented.

A block 128 determines whether the face located in the head box is recognized by determining whether the "tracked" face, as stored in a face recognition file 130, was recognized from a previous image during a previous iteration of the tracking-recognition routine 90. If the face within the head box is accordingly recognized, a block 132 stores the location of this "tracked" head box in the head location file 118 and in a tracking/re-cognition data file 134. Otherwise, a block 136 eliminates the head box since the head box does not relate to a tracked viewer who has been previously recognized.

The tracking routine 69 performs this tracking process for each head box located in a previous image. When all heads are so processed, the block 70 combines or fuses this tracking data with face recognition information as shown in more detail in FIG. 7. As will be discussed below, the computing system 52 stores scores resulting from the eigenface and template matching face recognition routines. These scores have corresponding values determined by how well the faces were recognized. A score for each viewer in the viewing audience results during each pass through the tracking-recognition routine 90, i.e. for each image of the monitored viewing area 10. Only the highest score is saved.

Figure 7:
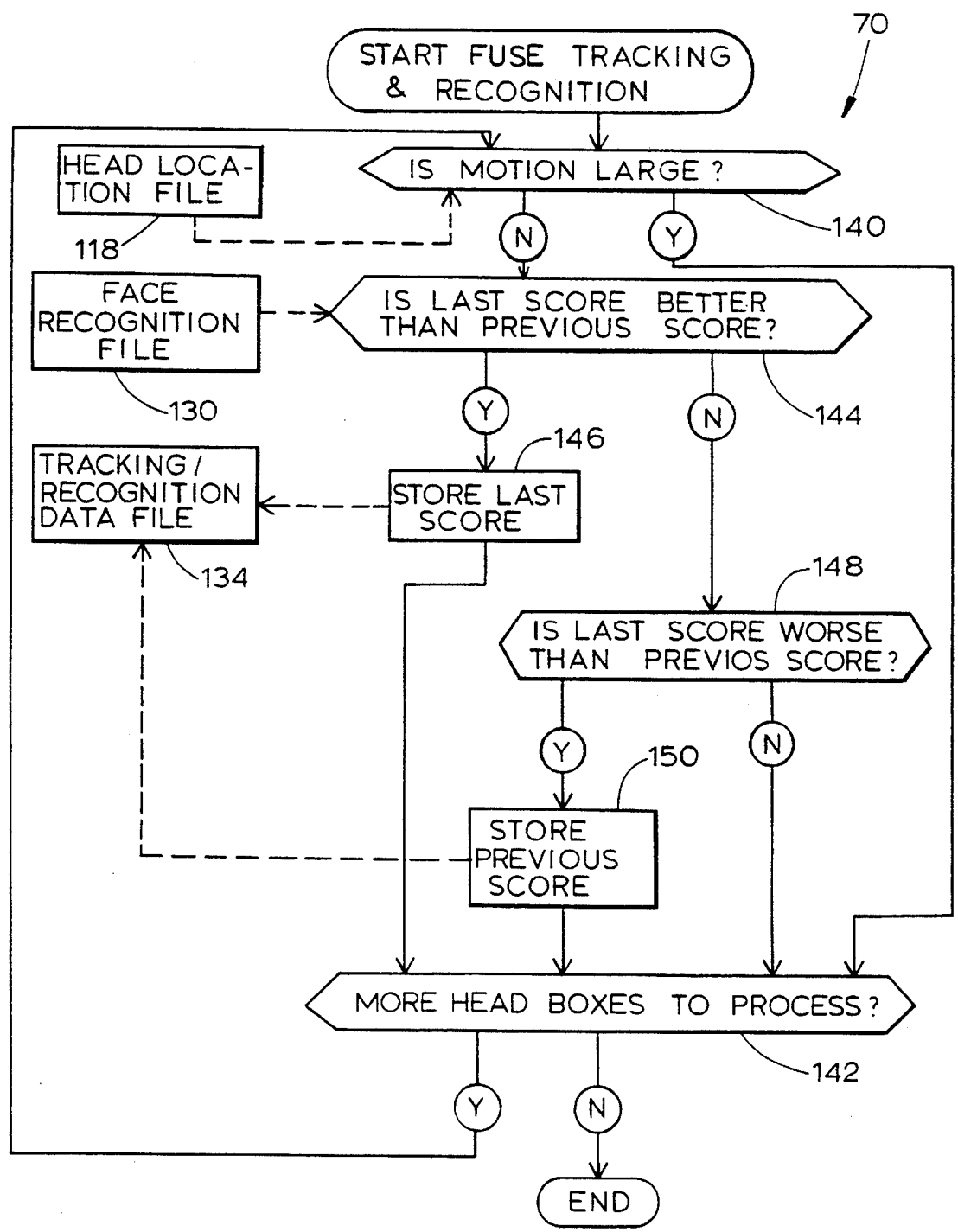

Accordingly, in FIG. 7, a block 140 determines from the information stored in the head location file 118 whether the motion of a head box is too large. If the motion is so large that a face cannot be located (because, for example, the face moved too far away for reliable recognition), the fuse tracking and recognition routine 70 is bypassed for that head box and a block 142 determines whether there are any more head boxes to process. If motion was not too large, a box 144 determines from the recognition scores stored in the face recognition file 130 whether the last (i.e. most recent) recognition score resulting from the most recent pass through the eigenface recognition routine 60 and the template matching routine 62, as will be discussed in more detail below, is better than the previous best recognition score resulting from a previous pass through the eigenface recognition routine 60 and the template matching routine 62.

If the last score is better than the previous best score, a block 146 stores the last score in the tracking-recognition data file 134 together with the tracking data contained therein and the block 142 determines whether there are any more head boxes to process. This tracking data may preferably be the location of the head currently being processed. If the last score is not better than the previous best score, a block 148 determines whether the last score is worse than the previous best score. If the last score is worse than the previous best score, a block 150 stores the previous best score in the tracking-recognition data file 134 together with the tracking data contained therein. If the last score is not worse than the previous best score, the last score and the previous best score must be the same so that there is no need to store the last score. The scores and tracking data stored in the tracking-recognition data file 134 are time stamped so that time based reports may be later generated. When all head boxes have been processed by the fuse tracking and recognition routine 70 as determined by the block 142, the routine 70 ends and control passes to the head finding routine 54 as is shown in FIG. 5.

Figure 8:
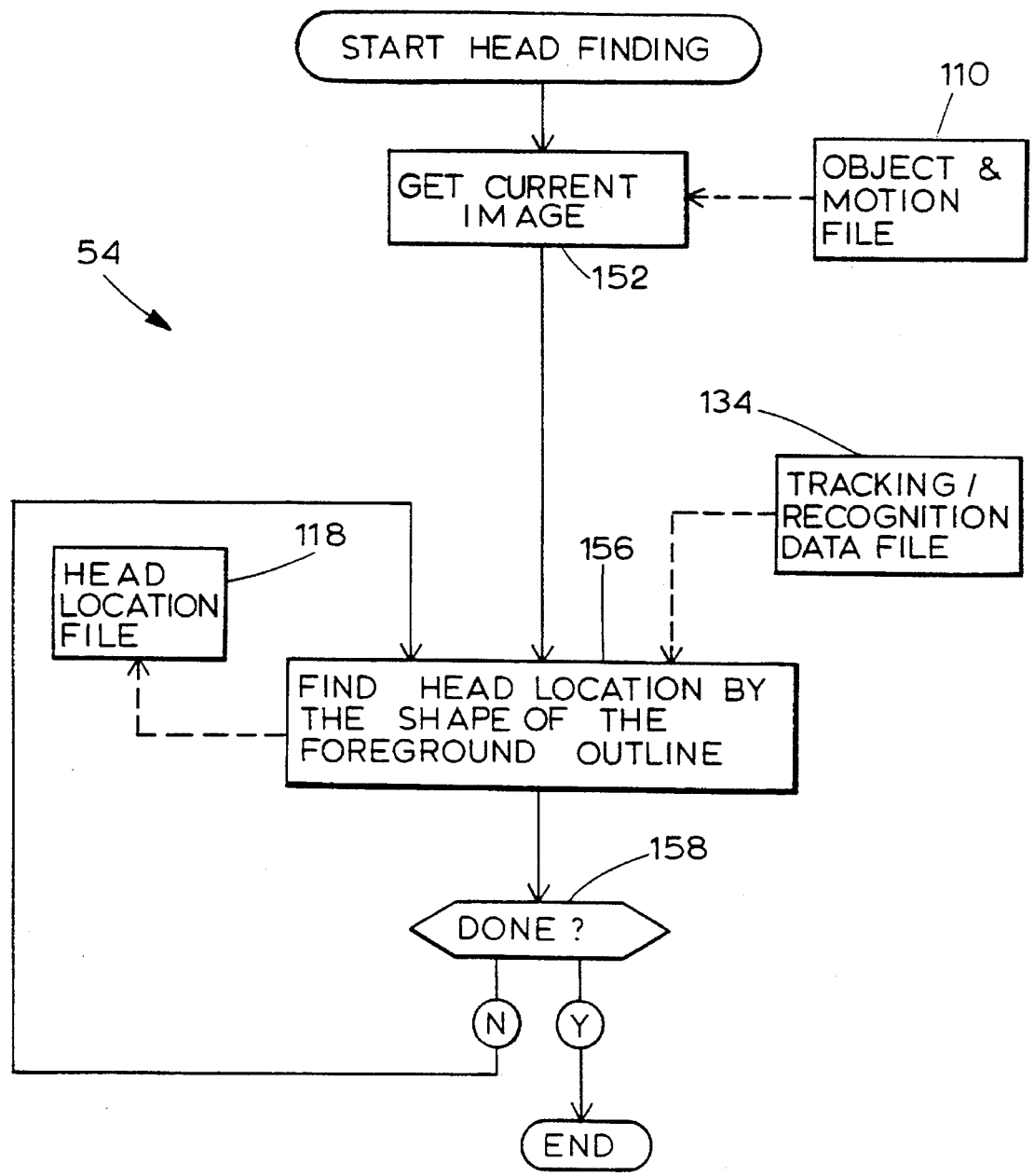

The head finding routine 54 is shown in more detail in FIG. 8. In the head finding routine 54, a block 152 retrieves the current foreground image of the monitored viewing area 10 from the object and motion file 110. A block 156 locates the heads of viewers by finding the outlines of objects in the foreground image, by then locating, with respect to those outlines, all vertical lines that could be the sides of heads and all horizontal lines that could be the tops of heads, and by then assuming that any ovals within cooperating vertical and horizontal lines are heads. As will be discussed hereinafter, the face recognition routines ultimately determine whether the ovals do, or do not, contain faces. The block 156 may preferably be provided with the ability to find a head even if the head in the monitored viewing area 10 is tilted. For example, the outlines of the objects in the foreground image may be rotated in order to search for any of the above mentioned vertical and horizontal lines and ovals which may be heads. The block 156 also draws a head box around the heads which it finds. The locations of any new heads are stored in the head location file 118. Once the locations of all of the found heads are so stored as determined by a block 158, head finding is ended and, as shown in FIG. 5, control passes to the face finding routine 58.

Figure 9:
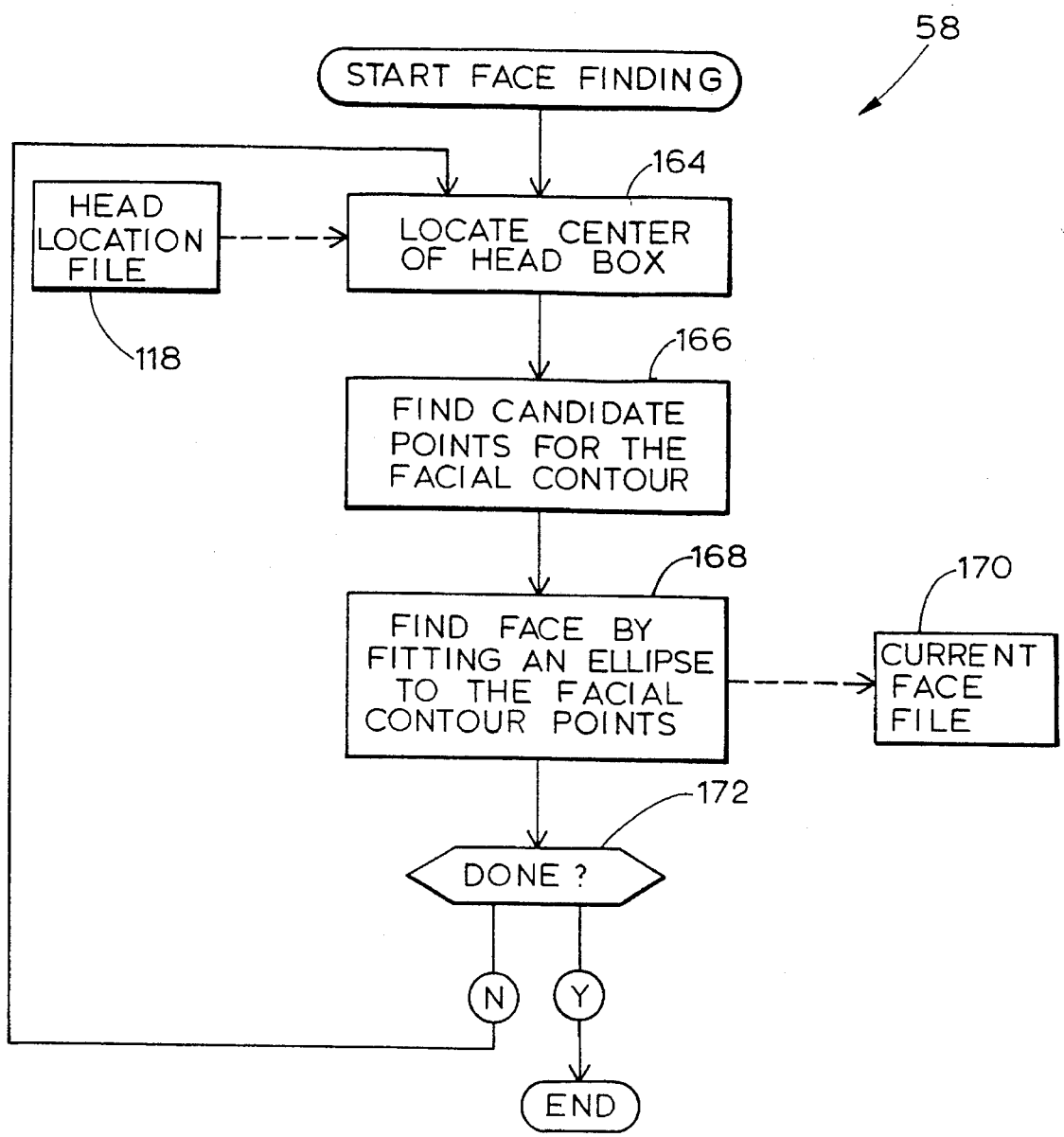

The face finding routine 58 is shown in more detail in FIG. 9. After completion of the head finding routine 54, a block 164 retrieves head locations from the head location file 118 and locates the geometric centers of the found heads. Next, a block 166 finds candidate points for the facial contours of the found heads which generally approximate a face. When the candidate points have been found, a block 168 finds the faces of the viewers in the foreground image by fitting an ellipse to the facial contour points. Any candidate points which vary too greatly from the ellipse are discarded and the ellipse is adjusted to the remaining points to become the location of the face. The block 168 stores the face framed by the adjusted ellipse in a current face file 170. When all faces in the foreground image have been found and stored, as determined by a block 172, the face finding process is ended. When the face finding process is ended, control passes to a face recognition and algorithm fusion routine 176 as shown in FIG. 5.

Figure 10:
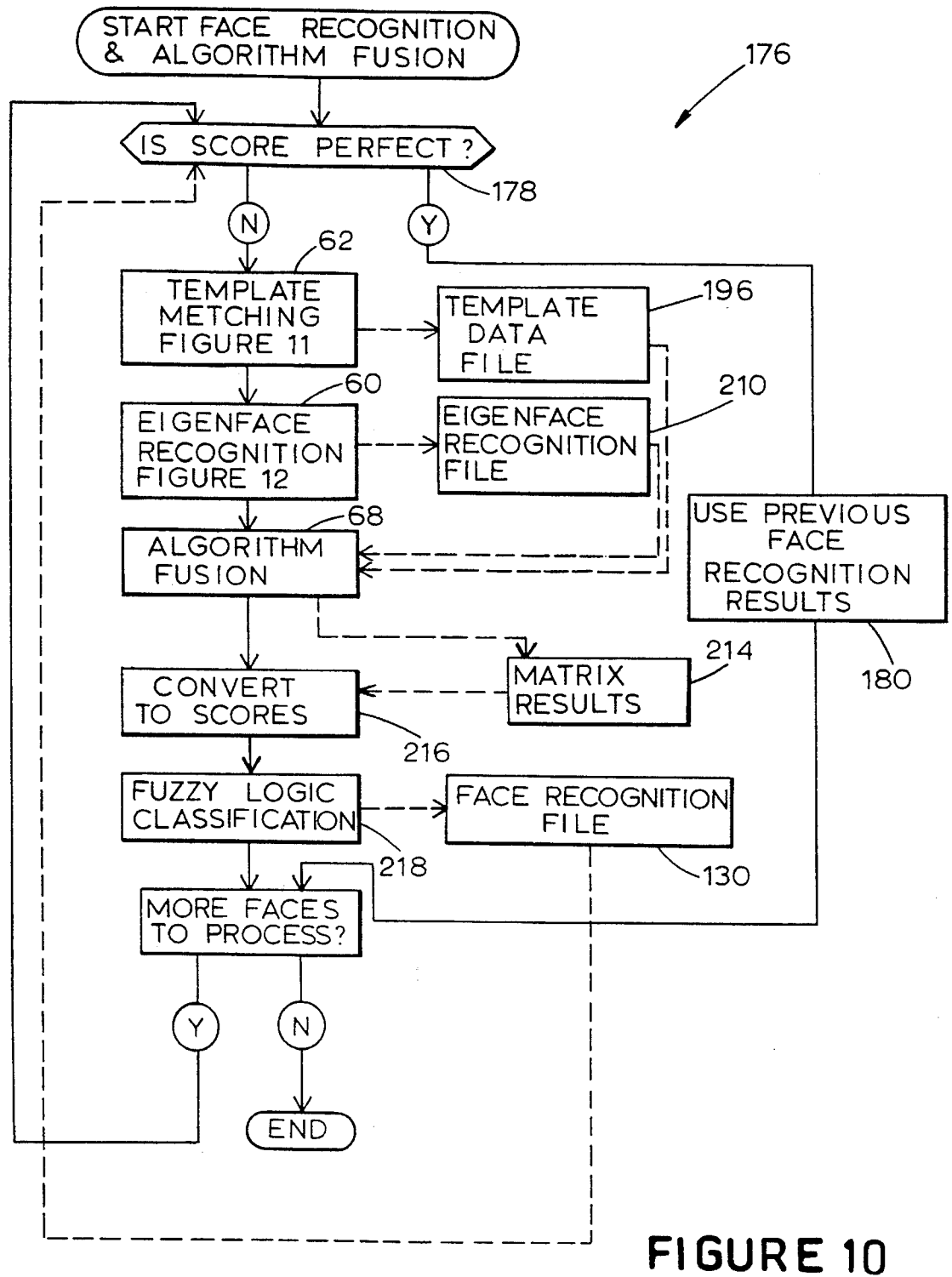

In the face recognition and algorithm fusion routine 176, as shown in FIG. 10, a block 178 determines, from the face recognition scores stored in the face recognition file 130, whether the face recognition score for a face being tracked by the tracking routine 69 is a perfect score, i.e. whether the score is at or above an upper limit. If so, there is no need for the face recognition and algorithm fusion routine 176 to recognize the tracked face again. Accordingly, a block 180 permits this score to be used as the face recognition score and, if all faces have been processed, the face recognition and algorithm fusion routine 176 exits. If, on the other hand, the score for a tracked face is not perfect, the template matching routine 62 is entered.

Template matching is done by performing pixel-by-pixel comparisons of each of the "found faces" in the current foreground image with each of the reference faces stored in a face library 182. Before the channel monitoring device 14 and the video equipment module 18 are first used in a household, the faces of all viewers expected to view the television set 12 in the household are entered by a face library learning block 184 (Figure 11) into the face library 182 as reference faces. Thus, the block 184 activates the cameras 32 and 34 to individually scan the viewers, and requests the viewers to identify themselves and to enter such demographic data about themselves as age and sex. For these purposes, a suitable keyboard may be provided, and the screen of the television set 12 may be used as a display device. These reference faces may include, for example, three views (left, right, and front) of each expected viewer. Thus, if there are four expected viewers, there will be twelve reference faces in the face library 182. The reference faces are multiplexed and digitized by the video multiplexer and digitizer 50 and are stored in the face library 182 as digital gray levels. These digital gray level faces may be referred to as reference facial image signatures of the template matching type. Similarly, the faces stored in the current face file 170 are also stored as digital gray levels and may be referred to as current facial image signatures. The average absolute pixel-by-pixel gray level difference between a face in the current face file 170 and a reference face stored in the face library 182 is a measure of the match between these faces.

Figure 11:
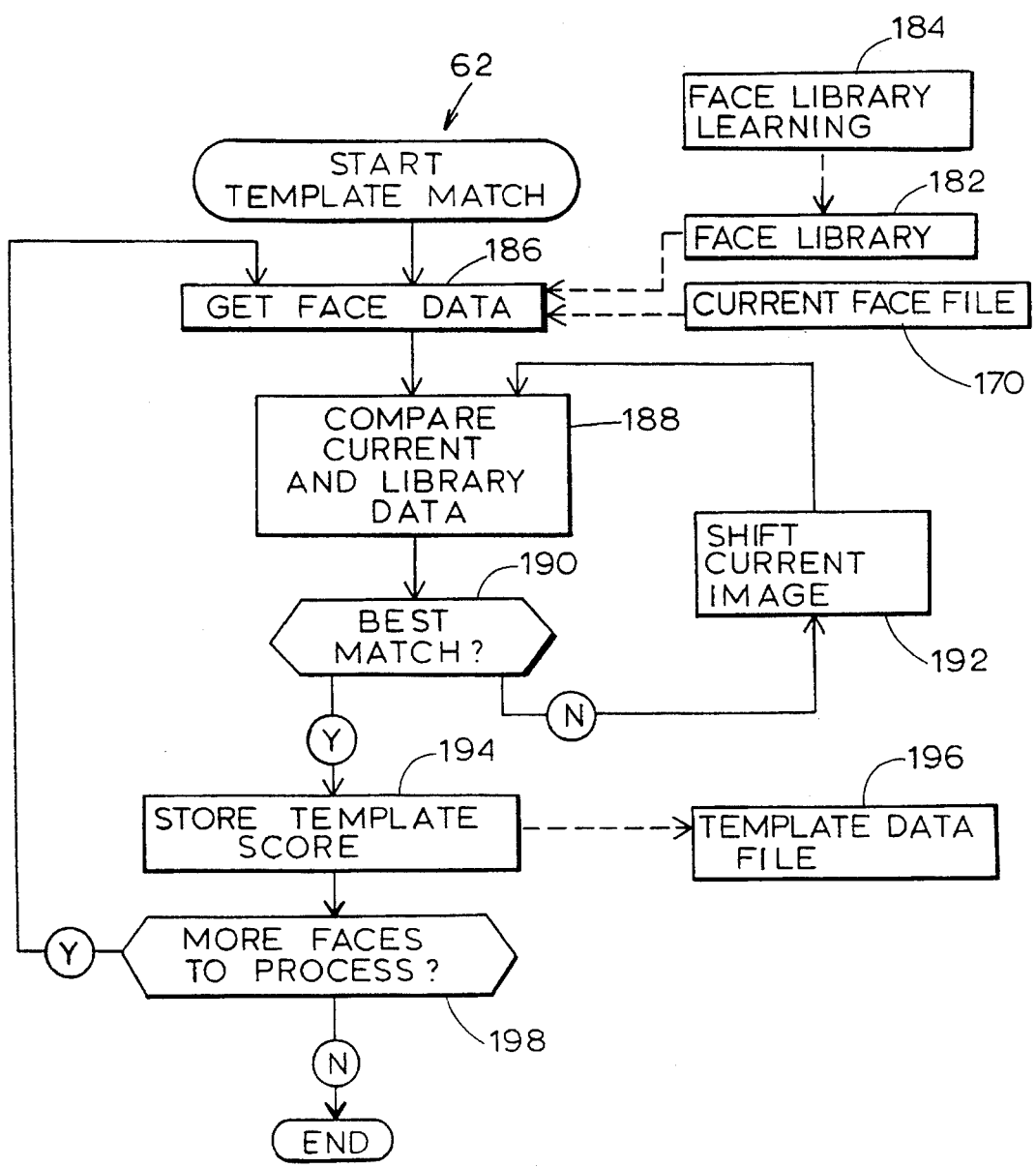

This template matching is shown in more detail in FIG. 11. A block 186 retrieves one of the faces in the current image of the monitored viewing area 10 from the current face file 170 and the reference faces stored in the face library 182. Once a face in the current image has been selected from the current face file 170 and the reference faces have been retrieved from the face library 182, a block 188 makes the pixel-by-pixel comparison between the selected face in the current image and each of the reference faces in the face library 182. As the selected face in the current image is compared to the reference faces, a block 190 tests the match and a block 192 shifts the selected face in the current image vertically and/or horizontally to find the alignment of the face in the current image with reference faces in the face library 184 that results in the best match. Also, the block 192 may make any size adjustments to better fit the contours of the current face with the reference faces in order to eliminate any differences due solely to the unknown range of the selected face in the current image. The shifting is performed by the block 192 by first using a coarse search such as a steepest ascent search to search for the largest local maximum. Once the local maximum is found, a fine search may then be made by shifting each time in the direction that previously resulted in the best match and then testing all of the previous untested nearest neighbor shift positions, the nearest neighbor shift positions being those within one pixel of the position currently under consideration. The template matching between the face in the current image and the reference faces in the face library 182 is completed when a best match position is found by the block 190 or when a maximum allowed number of shift steps is reached.

When the best match is found between a face in the current image and each reference face in the face library 182, a block 194 determines a score for each of the best matches. That is, a score is ascertained between a selected face in the current image and each of the reference faces in the face library 170. The scores thus ascertained are stored in a template data file 196. These scores may be the Euclidean distances between the selected face in the current image and the corresponding reference faces in the face library 182. Then, a block 198 determines if there are any more faces in the current image to process. If there are, the above process is repeated for each of the other faces in the current image until all of the faces in the current image have been processed, at which time the template match routine 62 is exited.

Figure 12:
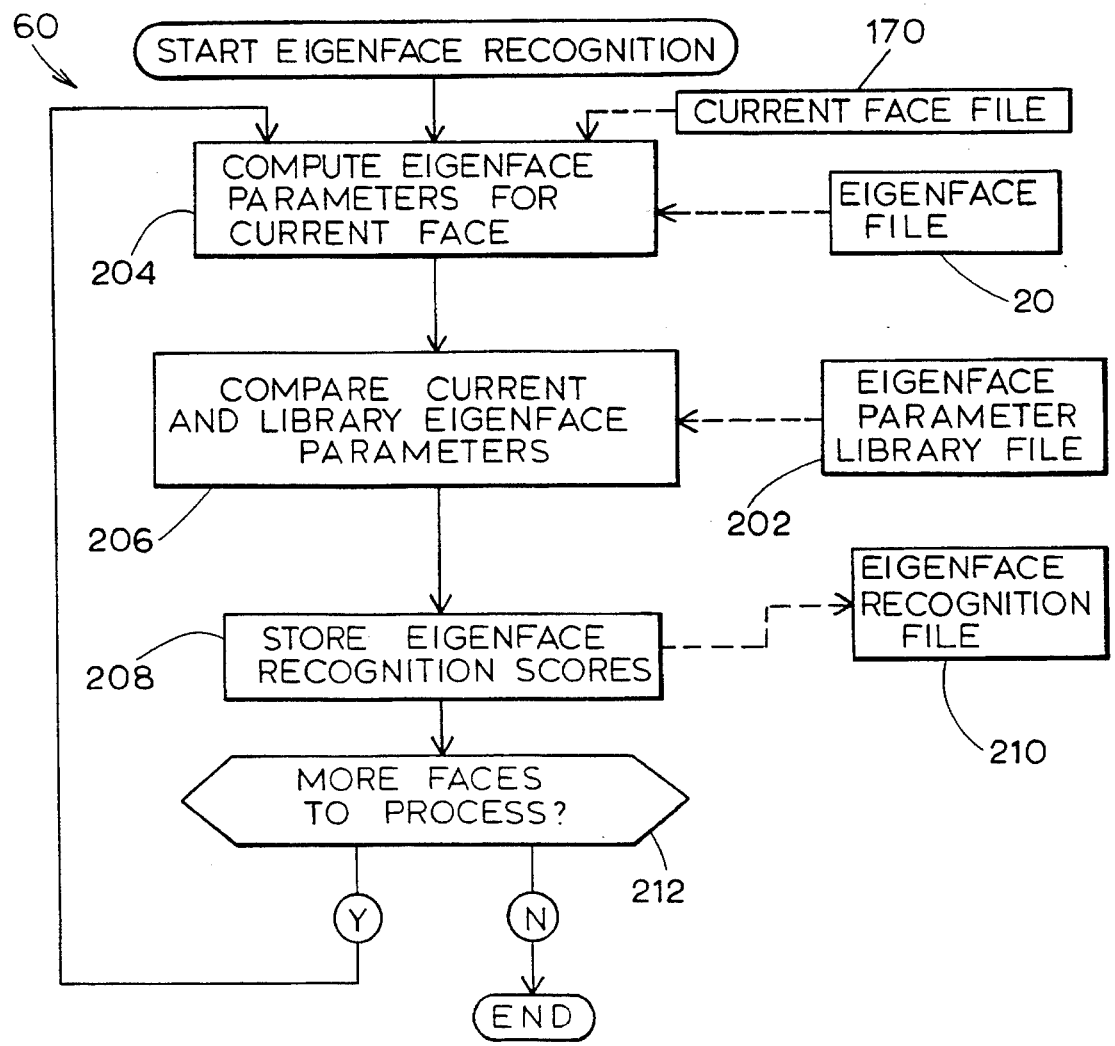

As shown in FIG. 10, at the end of the template match routine 62, the Eigenface recognition routine 60 is entered in order to perform an additional face recognition routine to increase the probability of correctly identifying the viewers in an image of the viewing area. The Eigenface recognition routine 60 is shown in more detail in FIG. 12. The Eigenface recognition routine 60 has been disclosed by Lu et al in the aforementioned U.S. Pat. No. 5,331,544. The three-dimensional orientation of the face is determined by the use of Eigenface analysis and face space theory as may be better understood by reference to the following published papers: a) L. Strovich and M. Kirby, "Low Dimensional Procedure for the Characterization of Human Faces", J. Optical Society of America A, vol 4, no. 3, pp 519–524, 1987; b) M. Kirby and L. Strovich, "Application of the Karhuen-Loeve Procedure for the Characterization of the Human Face", Transactions on Pattern Analysis and Machine Intelligence, vol. 12, no. 1, 1990; and, c) M. Turk and A. Pentland, "Eigenfaces for Recognition", Journal of Cognitive Neuroscience, vol. 3, no. 1, pp 71–86, 1991.

According to these articles, a set of Eigenfaces is calculated for the viewers in the household. These Eigenfaces may be calculated at the time that the reference faces of the household viewers are stored in the face library 182 by the face library learning block 184. During this time a set of images for the viewers is captured by the cameras 32 and 34. This set may include the right side, the left side, and the front of each viewer, for example. The heads and faces are located in these sets of images. From the heads and faces, a set of Eigenfaces are calculated using equation (6) from the Turk and Pentland article cited above, for example. This equation is as follows:

$$u_l = \sum_{k=1}^{M} v_{lk}\phi_k, \quad l=1,\ldots,M \quad (1)$$

where $u_l$ is the $l^{th}$ Eigenface, $v_{lk}$ is the $k^{th}$ component of the Eigenvector $v_l$ which is associated with the $l^{th}$ Eigenface, and $\Phi_k$ is a vector determined by subtracting the average of the faces of all of the M viewers from the face of the $k^{th}$ viewer. Although the number of calculated Eigenfaces is variable, this number should be large enough to produce reliable results. The Eigenfaces are stored in an Eigenface file 200.

The Eigenvectors $v_l$ are computed by solving the equations below for the Eigenvectors $v_l$ and for the Eigenvalues $\mu_l$:

$$A^T A v_l = \mu_l v_l \quad (2)$$

where $$A=[\Phi_1, \Phi_2, \ldots \Phi_m] \quad (3)$$

The calculation of the Eigenvectors $v_l$ and the Eigenvalues $\mu_l$ in the above equations can be done by well-known techniques for solving Eigensystems. For each face $\Phi$ mentioned above, its Eigenface parameters $\omega_l$ can be computed by using the following equation:

$$\omega_l = u_l^T \Phi \quad (4)$$

where $u_l$ is the $l^{th}$ Eigenface. A set of parameters is thus calculated for each view (left, right, and front) of each viewer. These parameters are stored in an Eigenface parameter library file 202 and may be referred to as reference facial image signatures of the Eigenface parameter type.

When the Eigenface recognition routine 60 is entered to recognize faces, a block 204 retrieves one of the current faces from the current face file 170 and, using equation (4) above and the Eigenfaces stored in the Eigenface file 200, calculates the Eigenface parameters for this current face which may be referred to as a current facial image signature of the Eigenface parameter type. A block 206 compares the parameters calculated by the block 204 to the reference parameters, which are stored in the Eigenface parameter library file 202, relating to each of the known viewers, and determines scores between the parameters of the face in the current image and the parameters of each of the known viewers. These scores may simply be the Euclidean distance between the parameters of the face in the current image and the parameters of each of the known viewers. A block 208 stores these scores in an Eigenface recognition file 210. If there are other faces in the current image, as determined by a block 212, these faces are additionally processed. When all faces in the current image have been processed, the Eigenface recognition routine 60 is ended and, as shown in FIG. 10, control then passes to the algorithm fusion block 68.

The algorithm fusion routine 68 preferably employs a discriminant function. This discriminant function may be a polynomial discriminant function such as a linear discriminant function (which is similar to a single layer neural network, or perceptron), a quadratic discriminant function, or a higher order polynomial discriminant function. A method employing a linear discriminant function is described in such references as "Pattern Recognition and Image Processing" by S. T. Bow (Marcel Dekker, N.Y., 1992). The algorithm fusion routine 68 employing a linear discriminant function according to the present invention uses a transformation matrix T in order to fuse the Eigenface scores and the template matching scores.

In order to determine the transformation matrix T, an input matrix I, which is based upon the known identity of the viewers in the monitored viewing area 10, is first assembled during installation of the audience measurement system of the present invention. The input matrix I is assembled as a rectangular matrix consisting of D rows and N×V×A+1 columns, where 1 allows a constant offset to be introduced into the calculated discriminant function, N is the number of people in the face library 182 to be recognized (i.e. the number of individuals in the household being monitored), V is the number of standard views of each person that is stored in the library (three views, consisting of a front view, a right side view, and a left side view, have been found suitable), A is the number of recognition algorithms to be employed in the recognition process (two in the example shown in FIG. 10, i.e. template matching and Eigenface recognition), and D is the number of entries in the input matrix I (i.e. the number of images upon which the template matching and the Eigenface routines were performed during assembling of the input matrix I). Thus, the rows of input matrix I consist of entries representing the template scores for each view of each person, the Eigenface scores for each view of each person, and the number 1.

An example of the first row, relating to the first image, of the input matrix I may be as follows; 1 T11L T11M T11R . . . T1NL T1NMT1NR E11L E11M E11R . . . E1NL E1NM E1NR, where each four character entry in the row represents a recognition score. The first character of the four character entry designates that the score resulted from either template matching (T) recognition or Eigenface (E) recognition, the second character designates the entry number D (i.e. the row number) to which the score relates, the third character designates to which of N viewers in the library the score relates, and the fourth character designates to which of the three views (the left L, middle M, or right R views) the score relates. An example of the second row of the matrix I is as follows: 1 T21L T21M T21R . . . T2NL T2NM T2NR E21L E21M E21R . . . E2NL E2NM E2NR, where the second digit designates that this second row is the second entry (i.e. relating to the second processed image).

Next, a rectangular output matrix O is assembled based upon the identity of the viewers known to be in the various images used to assemble the input matrix I. The output matrix 0 is a rectangular matrix comprising D rows and N columns where, as in the case of the input matrix I, D is the number of entries in the input matrix I, and N is the number of people in the face library 182 to be recognized (i.e. the number of individuals in the household being monitored). For example, suppose that person X was in an image D corresponding to a row Y in the input matrix I. Then, row Y in the output matrix O contains all zeroes except for the element in column X, which contains a one. An example of the first row, relating to the first image, of the output matrix 0 may be as follows; 11 12 . . . 1N, where each two digit entry is a zero if the person was not in the image or a one if the viewer was in the image. The first digit of the two digit entry designates the entry number D to which the zero or one relates, and the second digit designates to which of the N viewers in the library the zero or one relates.

A transformation matrix T is calculated as the product of the output matrix O and the Moore-Penrose inverse of the input matrix I. The method of determining the Moore-Penrose inverse of a matrix may be better understood with reference to the published literature, such as "Numerical Recipes in C: The Art of Scientific Computing", by W. H. Press, B. P. Flannery, S. A. Teukolsky and W. T. Vetterling (Cambridge University Press, N.Y., 1988). Once a transformation matrix T has been computed, it can be used by the algorithm fusion block 68 to fuse the template and Eigenface recognition scores contained in the template file 196 and the Eigenface recognition file 210, respectively. The block 68 accordingly forms a new input matrix I' each time that the blocks 62 and 60 determine template matching scores and eigenface recognition scores, respectively, relating to the viewers in an image. This new input matrix I' has one row relating to one image and contains the template matching and Eigenface matching scores from the template file 196 and the Eigenface recognition file 210, respectively, for each person in the library. This row must have the same formation as a row in the matrix I which was used in determining the transformation matrix T. The new input matrix I' is multiplied by the transformation matrix T to produce a new output matrix O'. The new output matrix O' is stored in a matrix results file 214. The resulting new output matrix O' is a single row matrix that has one score for each person in the library. The magnitudes of the scores in the new output matrix O' provide a quantitative estimate of the likelihood that a viewer was in the image processed by the blocks 60 and 62. A block 216 may then convert these scores to a more readily interpretable scale.

The scores from the block 216 may be stored directly in the face recognition file 130 or, if desired, may first be processed by a fuzzy logic block 218. Accordingly the scores from the block 216 may be compared by the block 218 to a threshold $T_{HIGH}$ and to a threshold $T_{LOW}$. If a score is above $T_{HIGH}$, that score may be stored in the face recognition file 130 together with the identity of the viewer, which identity is known from the position in the new output matrix O' occupied by that score. The score can be used as an indication of the confidence that the viewer has been correctly identified. If that score is between $T_{HIGH}$ and $T_{LOW}$, the score may be used in combination with the raw data, which was used by the algorithm fusion block 68, in an effort to estimate the identify of the viewer. This estimate and the associated score, which indicates the level of confidence in the estimate, are stored in the face recognition file 130. If the score just determined is better than the previous score, the score just determined is stored in the face recognition file 130. If the score just determined is worse than the previous score, the score just determined is discarded. The scores stored in the face recognition file 130 are time stamped so that the aforementioned time based reports may be later generated. When all faces have been processed, the face recognition and fusion routine 176 is exited with its results available to the decision maker 72.

Figure 13:
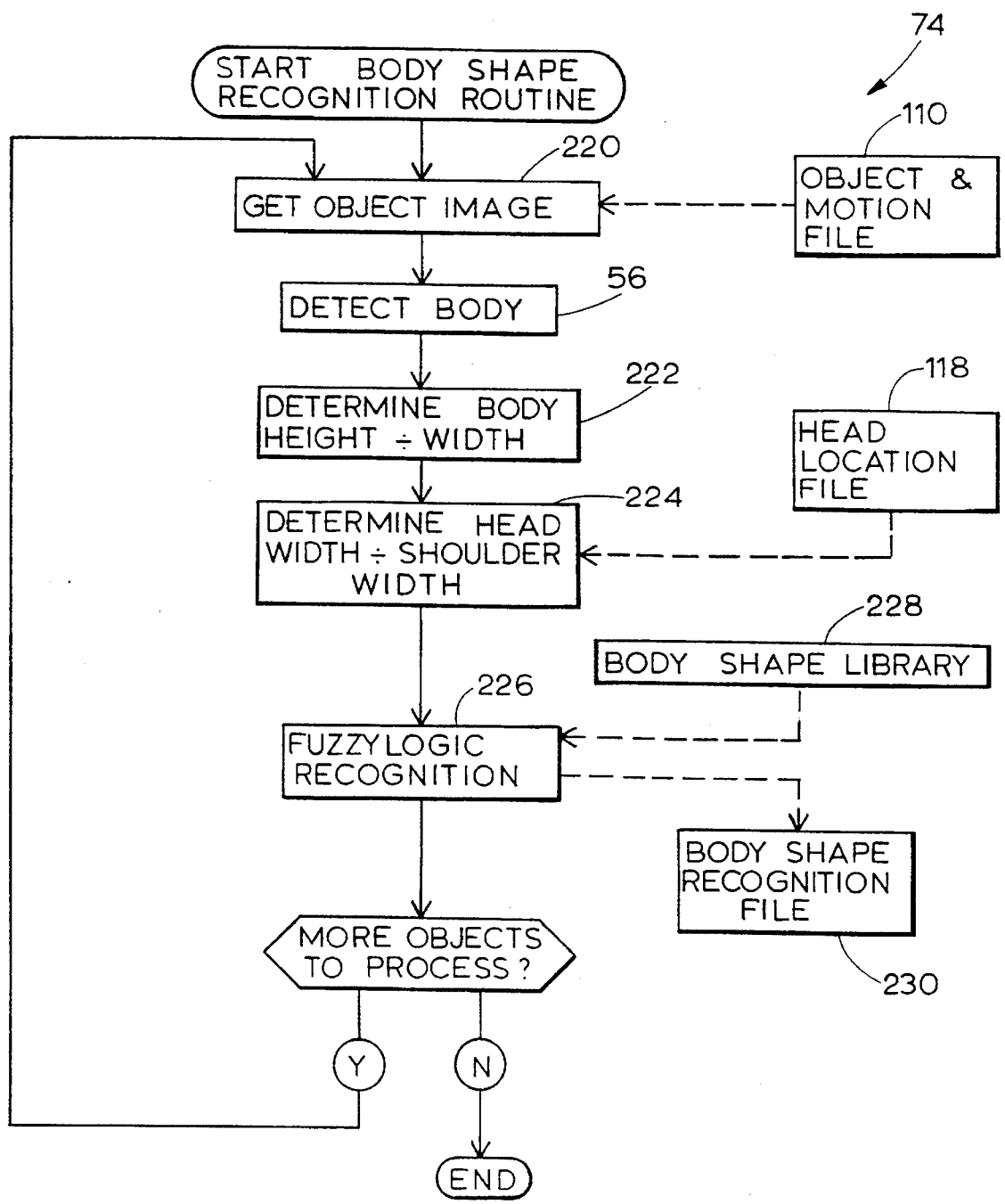
FIG. 13 shows a flow chart of the body shape recognition routine of FIG. 4.

When the face recognition and algorithm fusion routine 176 shown in FIG. 5 has been completed and the current image has been fully processed, the tracking-recognition routine 90 is ended and, as shown in FIG. 4, control passes to the block 74 which is shown in more detail in FIG. 13. In the body shape recognition routine 74, a block 220 retrieves the current foreground image from the object and motion file 110. The block 56 detects the body of any viewers in the foreground image. The heads of the viewers have previously been located by the head finding routine 54. With the location of a head known, the block 56 detects the body associated with that head by locating the shoulders of the body with respect to the head. The shoulders can be found by comparing the foreground image of a viewer to a general viewer outline using the head as a reference.

Once the shoulders, and consequently the body, of a viewer have been located, body ratios are then determined. Since absolute body dimensions would only be possible in a system that incorporates an accurate quantitative measurement of range between the viewer to be identified and the cameras 32 and 34, the body shape recognition routine 74 instead determines ratios of body dimensions. Accordingly, a block 222 divides the height of a located body of an object in the foreground object image by the width of the corresponding shoulders. Next, a block 224 divides the width of the head of that object by the width of the corresponding shoulders. The ratios determined by the blocks 222 and 224 may be referred to as a current body shape signature.

These ratios are compared by a block 226 to reference body shape ratios stored in a body shape library 228, which may be referred to as reference body shape signatures, in order both to estimate the identity of the object being processed, and to provide a score relating to the certainty of that identification. For example, if the ratios determined by the blocks 222 and 224 match exactly with the ratios of a standing adult stored in the body shape library 228, the certainty of the identification is high. However, if the ratios determined by the blocks 222 and 224 match an adult but relate to a viewer sitting on the floor, the certainty of the identification is lower since an adult is less likely to sit on the floor than is a child. Accordingly, the fuzzy logic applied by the block 226 may include any desired logic rules that relate to the certainty that an identified viewer is the object in the foreground image being processed. Since the results produced by the body shape recognition routine 74 may not be as accurate as the recognition results produced by the tracking/recognition routine 90, the scores produced by the body shape recognition routine 74 may be given lower values so that they have less influence on the decision maker 72.

The scores and identities produced by the fuzzy logic recognition block 226 are stored in a body shape recognition file 230 for subsequent use by the decision maker 72. These scores provide a quantitative estimate of the likelihood that a viewer's body is in the current image processed by block 74. The scores stored in the body shape recognition file 230 are time stamped so that the aforementioned time based reports may be later generated. The remaining objects in the current foreground image are similarly processed. When all of the objects have been so processed, the body shape recognition routine 74 is ended and control passes to the program 86 shown in FIG. 4.

Figure 14:
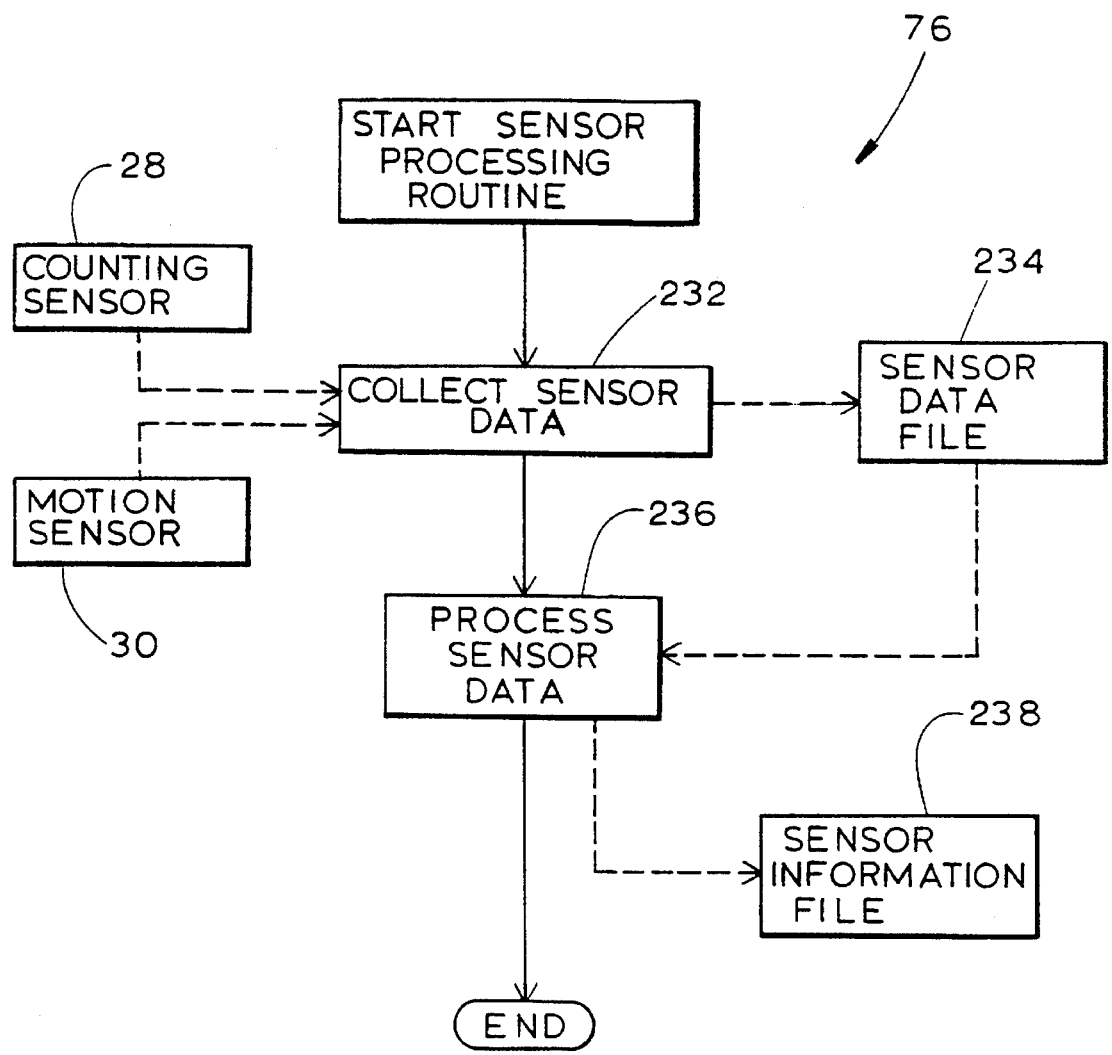
FIG. 14 shows a flow chart of the sensor information routine of FIG. 4.

As shown in FIG. 4, if the block 96 of FIG. 4 determines that image recognition is not good, the sensor processing routine 76 and the statistical data analysis routine 80 may be performed. The sensor processing routine 76, as shown in FIG. 14, processes data from the counting sensor 28 and from the motion sensor 30 in order to assist in the determination of the identity of the viewers in the monitored viewing area 10. Pyroelectric infrared point sensors, ultrasonic sensors, and microwave sensors, for example, can be used for the counting sensor 28 and the motion sensor 30. A block 232 retrieves the data from the counting sensor 28 and from the motion sensor 30 and stores this data in a sensor data file 234 for subsequent processing by a process sensor data block 236. The processing by the block 236 may include the steps of signal processing (e.g. to eliminate spurious background effects such as those due to a lamp that may trigger an infrared heat sensor or to a moving drape that may trigger an ultrasonic sensor) and of determining the composition of the audience in the viewing area 10 as taught by Kiewit and Lu in U.S. Pat. No. 4,644,509, the disclosure of which is incorporated herein by reference. The information resulting from the block 236 is stored in a sensor information file 238.

Figure 15:
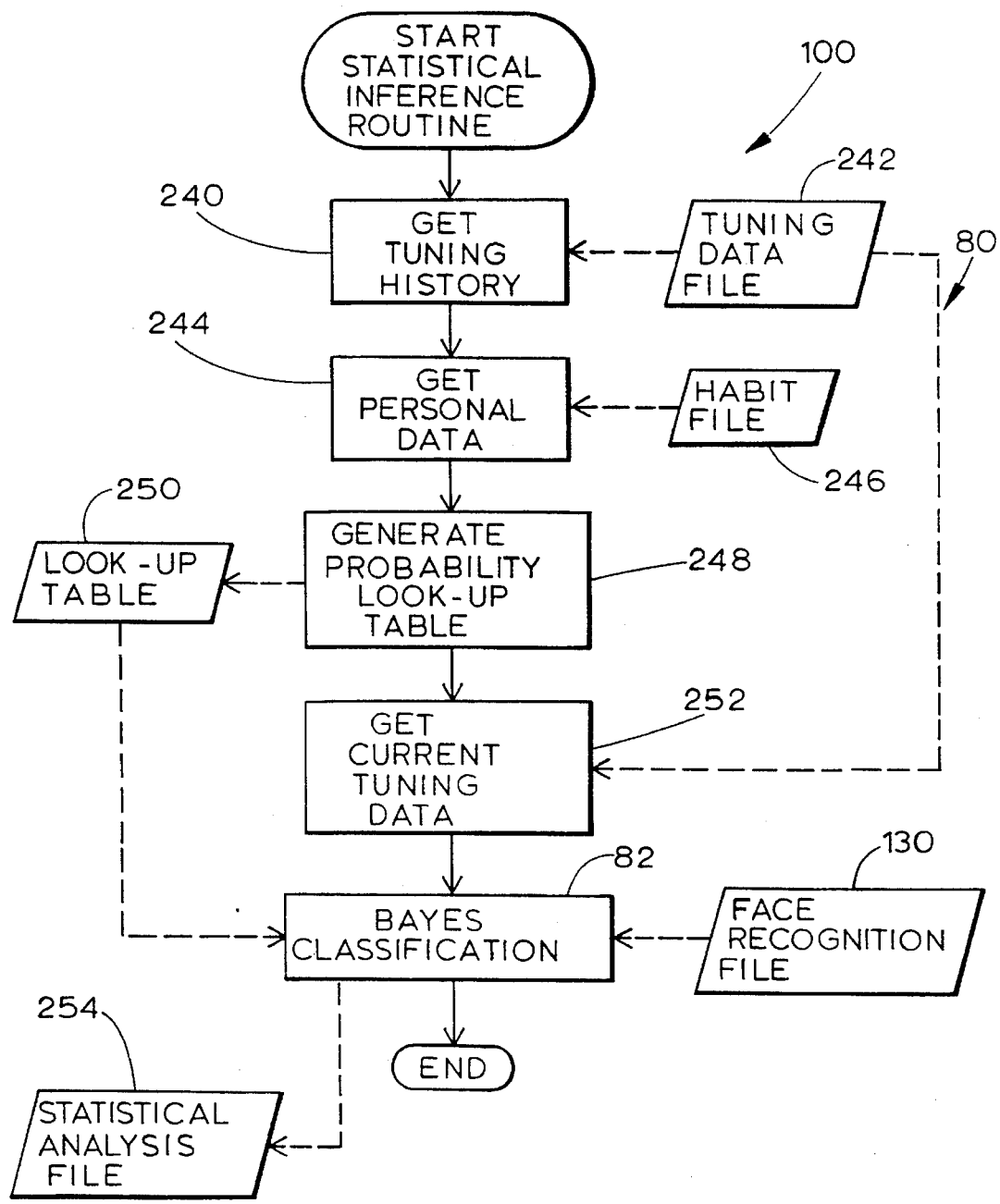
FIG. 15 shows a flow chart of the statistical inference routine of FIG. 4.

The statistical data analysis routine 100, which is shown in detail in FIG. 15 and which includes both the statistical routine 80 and the Bayes classification 82, makes certain statistical inferences from the viewing habits of the viewers in order to assist in the decision making process. The habit patterns of individuals can provide a useful input to an audience identification system. The use of historical data has been described by R. O. Duda and P. E. Hart in "Pattern Classification and Scene Analysis" (J. Wiley, N.Y., 1973).

As shown in FIG. 15, historical tuning records (e.g. data from the same quarter-hour period of the same day of previous weeks), which are stored in the local measurement computer 16, may be retrieved by a block 240 from a tuning data file 242. For example, each week may be broken down into 672 quarter hours. The data stored in the tuning data file 242 may include the identity of the viewers and the channel being watched for each quarter hour of each of the monitored weeks. A block 244 then retrieves the personal viewing habits of the known viewers from a habit file 246. The data in the habit file 246 may be entered manually (e.g. by having each family member provide scheduling data including when the family member is likely to be home, when the family member is likely to be watching TV, what channels the family member is likely to watch, at which times the family member is likely to watch those channels, etc.) or may be entered automatically by an adaptive learning process.

A block 248 generates a probability look-up table based upon the historical tuning records stored in the block 242 and the personal viewing habits of the known viewers stored in the habit file 246, and stores this look-up table in a look-up table file 250. The look-up table stored in the look-up table file 250 includes values $F_n$ for each known viewer. The values $F_n$ associated with each viewer are based upon the historical tuning records stored in the tuning data file 242 and are a priori probabilities that a corresponding viewer is present under a given set of circumstances. Each of the values $F_n$ for a given viewer may be equal to the ratio of the number of times that the given viewer is present during a corresponding one of the 672 quarter hours in a week to the total number of times that the corresponding quarter hour period was monitored.

The look-up table stored in the look-up table file 250 may also include conditional probabilities $P_n$ that each viewer in the face library 182 may be present in the monitored viewing area 10 during each quarter hour. The conditional probabilities $P_n$ are based upon the viewers' personal viewing habits stored in the habit file 246 rather than upon the historical data stored in the tuning data file 242. Thus, there is a probability P that a viewer is currently watching the television set 12 based upon the likelihood that the viewer is at home, that the viewer is likely to be watching TV, that the viewer is likely to be watching a particular channel, that the viewer is likely to be watching at a particular time, etc.

A block 252 retrieves the channel currently being viewed. The block 82 performs a Bayes classification to determine the probability that a viewer is watching the channel currently being viewed. Thus, the Bayes classification performed by the block 82 determines a weighted estimate of which of the known family members are likely to be in the viewing audience, and that estimate is stored in a statistical analysis file 254.

The Bayes classification employs (i) the a priori probability F that a viewer in the library is viewing the television set 12 during the current quarter hour, (ii) the number N of family members in the library, and (iii) an adjustable weighting factor W (i.e. the weight to be assigned to historical data) according to the following equation:

$$P'=P((1-W)+WNF) \quad (5)$$

where P' is the probability that a family member is present after adjustment for historical effects, P is the aforementioned conditional probability $P_n$ for viewer n, and F is the a priori probability $F_n$ for the viewer n. The value P' is stored in the statistical analysis file 254 for each family member. As shown in FIG. 4, when the statistical analysis is completed, control passes to the block 88 to determine if the TV is on.

Figure 16:
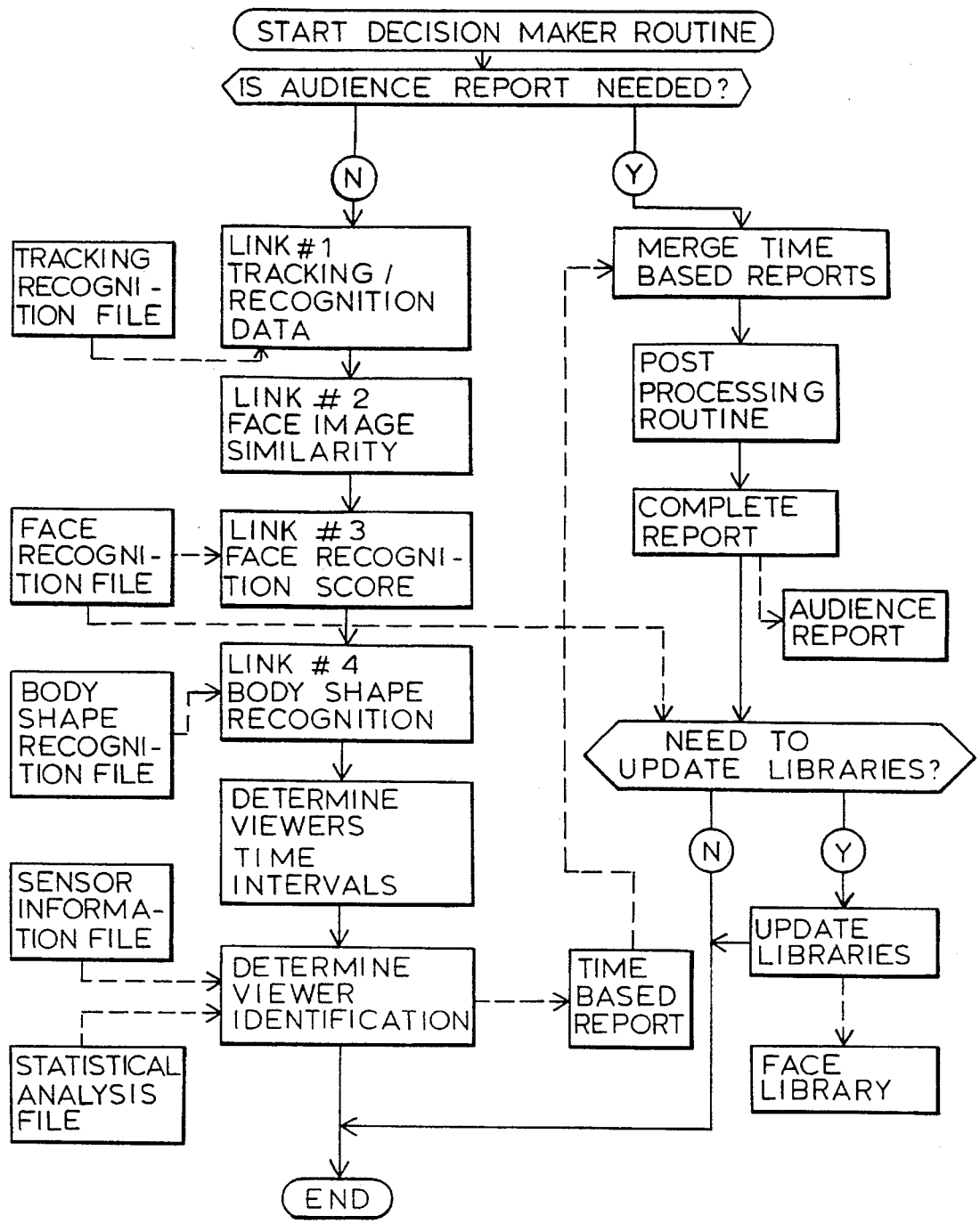
FIG. 16 shows a flow chart of the decision maker routine of FIG. 4.

When any of the blocks 94, 98, and 102 of FIG. 4 determine that the TV is no longer on, control passes to the decision maker 72 which determines the identities of the viewers in the monitored viewing area 10 and which is shown in more detail in FIG. 16. Although FIG. 4 shows that the decision maker 72 is entered only after the television set 12 has been turned off, it may be necessary to enter the decision maker 72 more frequently if the size of the memory of the computing system 52 is limited and if the television has been on so long that the collected data threatens to overflow this limited memory.

The decision maker 72 builds up a file 256 of time based reports and generates an audience report 258 when an audience report is requested. The process of building time based reports is one of linking scores in order to form an identity "chain" for each viewer in the monitored viewing area 10. At least one chain is built for each such viewer; however, it may be possible to build more than one chain for a viewer if, for example, the viewer moves to a new viewing position within the monitored viewing area 10.

Link #1 of a chain for a viewer consists of the best score for a tracked viewer. This score is retrieved from the tracking-recognition data file 134 by a block 260.

Link #2 of the chain for the viewer consists of the similarity between corresponding facial images detected in sequential images. Accordingly, a block 262 compares corresponding faces in each pair of sequential images by determining the Euclidean distance between such corresponding faces. This Euclidean distance is the score resulting from each such comparison. Each viewer in the monitored viewing area 10 will have an associated similarity score. If the similarity score is high, a link is built between the corresponding recognition records.

Link #3 of the chain for the viewer consists of the face recognition score which is retrieved from the face recognition file 130 by a block 264.

Link #4 of the chain for the viewer consists of the body shape recognition score which is retrieved from the body shape recognition file 230 by a block 266.

A chain is so constructed for each viewer. Each link of each chain is formed only if there are no pre-existing conflicting links which indicate that a viewer associated with a link was not in the monitored viewing area 10. These links of each chain relate the face recognition score, the similarity score, the tracking/recognition score, and the body shape recognition score to one another for a corresponding viewer in the library.

After all links have been formed, a block 268 determines, from the time stamped scores, the time interval corresponding to each chain.

Viewer identification is determined by a block 270. The block 270 first assigns a viewer identification to that chain containing the highest single score, as long as that score is above a predetermined threshold value. That viewer's identity is then marked as having been ascertained. This marking ensures that an individual will not be counted twice for any given viewing event. The block 270 next assigns a viewer identification to that chain containing the next highest single score, again as long as that score is above a predetermined threshold value. That viewer's identity is then marked as having been ascertained.

The process of identification thus continues in the order of declining scores. If a chain contains no scores above the pre-determined threshold, then the block 270 may rely upon the sensor information contained in the file 238 and upon the weighted estimates of those known family members who are likely to be in the viewing audience during a quarter hour as stored in the statistical analysis file 254 to infer the identity of a viewer. For example, chain AB may have its highest score substantially equal to, but just below, the threshold. If three viewers have already been identified, if the sensor information stored in the file 238 indicates the presence of a fourth viewer, and if chain AB pertains to that fourth viewer, the identity of the fourth viewer may be inferred from the chain AB and from the statistical probability that this fourth viewer is likely to be watching the television set 12 during the relevant quarter hour. Viewer identification data are then entered into the time based report file 256.

The second process conducted by the decision maker 72 consists of extracting data from the time based report file 256, merging these reports in a block 272 to form a single viewing log, checking that log in a block 274 for internal consistency, and generating a completed audience report 258 in block 276. The completed report 258 may be communicated to the "home unit" to be merged with tuning data in order to form a composite report that can be transmitted to a central data collection office. The latter steps of composing and forwarding data are well known in the art of television audience measurement.

It will be appreciated that while the process recited above may provide an on-going measure of the audience of television programs, additional steps may advantageously be included to update the reference libraries to keep the reference data current. Thus, various system parameters can be automatically modified over a period of time to avoid degradation in recognition that may occur, for example, due to changes in the physical appearance of household members or to the addition of a new household member. When the facial features of a household member change (e.g. due to a previously clean-shaven man growing a beard), the average recognition scores for that person drop significantly over time. This downward trend in recognition scores can be detected by a block 280. If this trend is detected, a block 282 adds new, more recent images of that person to the face library 182. Once new images are added, a new transformation matrix T would have to be computed by gathering new historical data of the scores of each person with respect to each of the images in the expanded library. The new historical data would then be used to calculate a new transformation matrix T by the procedures discussed above.

Since the recognition rate of the audience measurement system may not be perfect, the system can also optionally collect data manually to assist the audience measurement system in certain critical areas. This manual data collection system is shown in FIG. 3 and includes a prompt or display device 72C to interactively query a viewer and to prompt the viewer to confirm or to supply information about the viewer's identity by appropriately operating an IR remote control 72D. Accordingly, the IR remote control device 72D transmits a signal which is received by an IR receiver 72B which may be included, for example, in the video equipment module 18. The received IR signal may be suitably processed by the receiver 72B to supply a manually supplied identity datum 72A which specifies the identity of the viewer. This manually supplied identity datum 72A may be used by the block 270 (FIG. 16) of the decision maker 72 to replace any automatically generated viewer identifications.

There are several critical areas in which the manually supplied identity datum can be used. For example, in the block 280 of FIG. 16, a decision is made to update the face library 182 when a downward recognition trend is observed. If the block 280 detects this trend with respect to a viewer, the block 282 can cause the prompt or display device 72C to require that viewer to provide his or her identity through the use of the IR remote control 72D.

Furthermore, when the decision maker 72 identifies a viewer as a guest, the prompt or display device 72C may be activated to require the guest to provide his or her identity through the use of the IR remote control 72D.

This manual data collection system can also resolve any inconsistent results. For example, if three viewers should be present in the monitored viewing area 10 but the computing system 52 determines that there are only two viewers present, there is an inconsistency. If so, the prompt or display device 72C may be activated to require the viewers in the monitored viewing area 10 to provide their identities through the use of the IR remote control 72D in order to resolve the inconsistency.

If the decision maker 72 determines the identity of a viewer but with a low confidence level, the prompt or display device 72C may be activated to require the viewers in the monitored viewing area 10 to provide their identities through the use of the IR remote control 72D in order to confirm the identities.

As shown in FIG. 16, the manually supplied identity data is provided to the block 270 which fuses this data with any or all of the identity-indicating recognition scores and uses the fused information in order to determine viewer identity.

Furthermore, since each of the recognition routines as described above produces both an identity and a score which is a measure of the quality of that identity, it is possible to configure the system of the present invention so that any identity that has an associated score in excess of some predetermined threshold can be used to update the relevant reference library file.

The foregoing discussion has been directed toward systems in which the reference libraries that are used for recognition are built up from images of people who are likely to be viewers in the monitored area (e.g. members of a statistically selected household). It may be possible, however, to construct a system in which a single, standardized set of image features are used in all measurement situations. The Eigenface methods described above are particularly notable for supporting such a system. For example, an Eigenface recognition subsystem can employ a master set (or library) of images from a pre-selected group of people whose features were chosen to span the entire gamut of faces that might be encountered in subsequent measurements. In this case, a prospective audience member's face would be initially learned by an in-home measurement system with reference to the Eigenface master set by constructing a set of image identification parameters that would be stored in a portion of the Eigenface parameter library file 202. One advantage of a system of this sort is an improved consistency in visitor data—i.e. an image of a given visitor would generate substantially the same Eigenface score in any sampled household if all households used the same master data set. (If, on the other hand, each household provided its own Eigenface "universe" for recognition, a given unknown person would generate a substantially different numerical score in each sample household that he visited.)

Although the present invention has been described with respect to several preferred embodiments, many modifications and alterations can be made without departing from the scope of the invention. Accordingly, it is intended that all such modifications and alterations be considered as within the spirit and scope of the invention as defined in the attached claims.

We claim:

1. An image recognition apparatus for passively identifying individuals in a monitored area comprising:

means for storing a first set of reference facial image signatures wherein each reference facial image signature in the first set corresponds to a predetermined one of said individuals and is formed from an initial image of a predetermined individual by a first facial recognition methodology;

means for storing a second set of reference facial image signatures wherein each reference facial image signature in the second set corresponds to a predetermined one of said individuals and is formed from an initial image of a predetermined individual by a second facial recognition methodology which is different from the first facial recognition methodology;

image capturing means for capturing video images of a monitored area;

means for extracting a first current facial image signature from the video image by processing the video images and by utilizing the first facial recognition methodology and for providing a first set of identity-indicating scores by comparing the first current facial image signature to each reference facial image signature of the first set of reference facial image signatures;

means for extracting a second current facial image signature from the video image by processing the video images and by utilizing the second facial recognition methodology and for providing a second set of identity-indicating scores by comparing the second current facial image signature to each reference facial image signature of the second set of reference facial image signatures; and, means for fusing the first and second sets of identity-indicating scores to form a set of composite identity-indicating scores from which individuals may be identified.

2. The image recognition apparatus of claim 1 wherein the first set of reference facial image signatures are reference template signatures and wherein the means for extracting a first current facial image signature comprises means for extracting a current image template signature and for providing the first set of identity-indicating scores by comparing the current image template signature to each of the reference template signatures.

3. The image recognition apparatus of claim 1 wherein the second set of reference facial image signatures are reference Eigenface signatures and wherein the means for extracting a second current facial image signature comprises means for extracting a current image Eigenface signature and for providing the second set of identity-indicating scores by comparing the current image Eigenface signature to each of the reference Eigenface signatures.

4. The image recognition apparatus of claim 3 wherein the means for fusing comprises means for employing a linear discriminant function to form the set of composite identity-indicating scores.

5. The image recognition apparatus of claim 1 wherein the means for fusing comprises means for employing at least a quadratic discriminant function to form the set of composite identity-indicating scores.

6. The image recognition apparatus of claim 1 further comprising:

means for storing reference body shape signatures, wherein each reference body shape signature corresponds to a predetermined one of the individuals and is formed from an initial image of a predetermined individual by a body shape recognition methodology; and, means for extracting a current body shape signature from the video images by utilizing the body shape recognition methodology and for providing a third set of identity-indicating scores by comparing the current body shape signature to each reference body shape signature.

7. The image recognition apparatus of claim 6 wherein the first set of reference facial image signatures are reference template signatures and wherein the means for extracting a first current facial image signature comprises means for extracting a current image template signature and for providing the first set of identity-indicating scores by comparing the current image template signature to each of the reference template signatures.

8. The image recognition apparatus of claim 6 wherein the second set of reference facial image signatures are reference Eigenface signatures and wherein the means for extracting a second current facial image signature comprises means for extracting a current image Eigenface signature and for providing the second set of identity-indicating scores by comparing the current image Eigenface signature to each of the reference Eigenface signatures.

9. The image recognition apparatus of claim 6 wherein the means for fusing comprises means for employing a polynomial discriminant function to form the set of composite identity-indicating scores.

10. An image recognition system for identifying an individual in a monitored area comprising:

means for storing a plurality of reference facial image signatures and a plurality of reference body shape signatures, each stored reference facial image signature and each reference body shape signature corresponding to a predetermined individual;

video camera apparatus adapted to capture a current image of an individual in the monitored area;

means responsive to the video camera apparatus for extracting a current facial image signature from the current image, for extracting a current body shape signature from the current image, for comparing the current facial image signature with the stored reference facial image signatures to thereby generate a first set of scores wherein each score of the first set of scores represents a degree of agreement between the current facial image signature and a corresponding stored reference facial signature, for comparing the current body shape signature with the stored reference body shape signatures to thereby generate a second set of scores wherein each score of the second set of scores represents a degree of agreement between the current body shape signature and a corresponding stored reference body shape signature, for forming a composite set of scores from the first and second sets of scores, and for selecting a maximum score from the composite set of scores.

11. The image recognition system of claim 10 further comprising:

an historical record related to a probability that the individual is present in the monitored area; and, means for estimating, from the historical record, a probability that the individual is present in the monitored area;

wherein the means responsive to the video camera apparatus for extracting a current facial image signature from the current image determines the identity of the predetermined individual from the first and second sets of scores and from the probability that the predetermined individual is present in the monitored area.

12. The image recognition system of claim 10 further comprising:

sensing means for sensing the presence of an individual in the monitored area; and, means responsive to the sensing means for estimating the number of individuals present in the monitored area;

wherein the means responsive to the video camera apparatus for extracting a current facial image signature from the current image determines the identity of the predetermined individual from the first and second sets of scores and from the estimated number of individuals present in the monitored area.

13. A system for identifying predetermined persons in a monitored area, the persons having established viewing or listening habits during past days, the system comprising:

an historical record of the viewing or listening habits of the predetermined persons during past days;

means for forming, from the historical record, a first probability estimate that predetermined persons are present in the monitored area;

means for storing a plurality of reference facial image signatures wherein each of the reference facial image signatures corresponds to a predetermined person;

means for capturing a current image of the monitored area;

means for extracting a current facial image signature from the current image;

means for comparing the current facial image signature with the reference facial image signatures to form a second probability estimate that predetermined persons are present in the monitored area; and, means for identifying predetermined persons from the first and second probability estimates.

14. The system of claim 13 further comprising means for locating and tracking a person in the monitored area.

15. A method for determining that a predetermined individual is present in a monitored area during a predetermined time interval, the method comprising the following steps:

a) forming a first set of reference facial image signatures wherein each reference facial image signature of the first set is extracted from an initial image of a plurality of individuals according to a first methodology:

b) forming a second set of reference facial image signatures wherein each reference facial image signature of the second set is extracted from an initial image of the plurality of individuals according to a second methodology which is different from the first methodology;

c) capturing a current image of the monitored area;

d) locating a face of an individual from the current image;

e) extracting a first current facial image signature from the located face by use of the first methodology;

f) comparing the first current facial image signature with the first set of reference facial image signatures to generate a first set of scores;

g) extracting a second current facial image signature from the located face by use of the second methodology;

h) comparing the second current facial image signature with the second set of reference facial image signatures to generate a second set of scores;

i) combining the first and the second sets of scores to form a composite set of scores;

j) determining if the predetermined individual is present in the monitored area from the composite set of scores.

16. The method of claim 15 further comprising the steps of locating and tracking an individual in the monitored area.

17. A method for tracking an individual within a monitored area comprising the following steps:

a) forming a first reference facial image signature related to the individual according to a first methodology:

b) forming a second reference facial image signature related to the individual according to a second methodology which is different from the first methodology;

c) obtaining a current image and a set of subsequent images of the monitored area;

d) locating a current facial image of the individual in the current image;

e) extracting a first current facial image signature from the current facial image by use of the first methodology;

f) comparing the first current facial image signature with the first reference facial image signature to generate a first score;

g) extracting a second current facial image signature from the current facial image by use of the second methodology;

h) comparing the second current facial image signature with the second reference facial image signature to generate a second score;

i) identifying the individual from the first and second scores; and, j) tracking the identified individual from the current image through at least some of the subsequent images.

18. The method of claim 17 wherein the step of forming a first reference facial image signature related to the individual according to a first methodology comprises the step of forming a reference template signature, wherein the step of extracting a first current facial image signature from the current facial image by use of the first methodology comprises the step of extracting a current image template signature, and wherein the step of comparing the first current facial image signature with the first reference facial image signature to generate a first score comprises the step of comparing the current image template signature to the reference template signature.

19. The method of claim 17 wherein the step of forming a second reference facial image signature related to the individual according to a second methodology comprises the step of forming a reference Eigenface signature, wherein the step of extracting a second current facial image signature from the current facial image by use of the second methodology comprises the step of extracting a current image Eigenface signature, and wherein the step of comparing the second current facial image signature with the second reference facial image signature to generate a second score comprises the step of comparing the current image Eigenface signature to the reference Eigenface signature.

20. The method of claim 17 wherein the step of identifying the individual from the first and second scores comprises the step of employing a polynomial discriminant function to form a third composite score from the first and second scores.

21. The method of claim 20 comprising the further following steps;

detecting declining scores as current facial image signatures are compared with the first reference facial image signature; and, replacing the first reference facial image signature with a current facial image signature when the declining scores are below a predetermined value.

22. The method of claim 17 comprising the further following steps;

detecting declining scores as current facial image signatures are compared with the first reference facial image signature; and, replacing the first reference facial image signature with a current facial image signature when the declining scores are below a predetermined value.

* * * * *